United States Patent [19]

Burlage et al.

[11] 4,173,017
[45] Oct. 30, 1979

[54] PROGRAMMABLE SIGNAL PROCESSOR FOR DOPPLER FILTERING

[75] Inventors: Donald W. Burlage; Neal B. Lawrence, both of Huntsville; Larry B. Owen, Union Grove, all of Ala.

[73] Assignee: The United States of America as represented by the Secretary of the Army, Washington, D.C.

[21] Appl. No.: 786,697

[22] Filed: Apr. 11, 1977

[51] Int. Cl.² ............................................. G01S 9/42
[52] U.S. Cl. .................................. 343/7.7; 343/5 NQ
[58] Field of Search ............................. 343/7.7, 5 NQ

[56] References Cited

U.S. PATENT DOCUMENTS

| | | | |
|---|---|---|---|
| 3,742,500 | 6/1973 | Freedman | 343/7.7 |
| 3,858,208 | 12/1974 | Parke et al. | 343/7.7 X |
| 3,860,924 | 1/1975 | Evans | 343/7.7 |
| 3,877,011 | 4/1975 | Holberg et al. | 343/7.7 |
| 3,882,498 | 5/1975 | McGriffin | 343/7.7 X |

*Primary Examiner*—Malcolm F. Hubler

*Attorney, Agent, or Firm*—Nathan Edelberg; Robert P. Gibson; Freddie M. Bush

[57] ABSTRACT

A programmable signal processor is disclosed for use with an array radar. The programmable signal processor has quadrature channel, moving target indicators followed by post detection integration. The moving target indicators can be programmed to have any desired frequency response and can be adapted as a function of antenna beam position, range bin sector, or time. The processor also contains a high speed buffer which provides the capability to record, in real time, unprocessed raw video as well as corresponding processed moving target indicators and integrator outputs. The signal processor simultaneously processes the in-phase and quadrature components of the input signal. The output processed video signal is a digital representation of the input signal with fixed or slow moving clutter reduced and the signal-to-noise ratio improved by the response of the moving target indicator filter and the integrator respectively.

18 Claims, 14 Drawing Figures

PROGRAMMABLE SIGNAL PROCESSOR FOR DOPPLER FILTERING

DEDICATORY CLAUSE

The invention described herein may be manufactured, used, and licensed by or for the Government for governmental purposes without the payment to us of any royalties thereon.

BACKGROUND OF THE INVENTION

Through electronic scanning, phase array antennas allow a multiple engagement capability in array radars tracking of a multiple of targets simultaneously. While a manual operator can observe the results of array radar tracking and change the parameters by which the radar operates, radar/computer interface aspects of modern radar allows much more rapid operation of the radar and allows digital signal processing and control technology to provide rapid and accurate target tracking. In a phase monopulse, phased-array radar for performing the functions of sector search and target track for low altitude, all weather target tracking one of the primary requirements is suppression of clutter interference without a corresponding reduction in detectability of fast moving targets. A single antenna consisting of one vertical and one horizontal line array of 64 elements each can perform search over approximately 100° in azimuth and can provide target track information in both azimuth and elevation. In a typical array radar system a general purpose computer may be used as a system controller. For simple sector scan search, this computer may generate the search raster for the B-scope display of detections from the signal processor and raw video from the receiver. It also transfers data to the antenna phase command generator which shifts the phase of the antenna elements to electrically position the beam. In the track mode, processed data produced by the signal processors are transferred to the computer where tracking error signals are derived for closing the digital tracking loops in range and angle. A digital moving target indicator (MTI) canceller for signal processing in MTI radars is disclosed in U.S. Pat. No. 3,852,742 issued to R. H. Fletcher and D. W. Burlage. The invention is a recursive digital MTI canceller wherein the storage stages are preset in accordance with unwanted, large stationary interference signals. A technical report No. RE-TR-70-9 entitled "High-Speed Digital Moving Target Indicator Arithmetic Unit for Experimental Array Radar Signal Processor" by L. D. Ostlie, Sept. 15, 1970 is published by the Research and Engineering Directorate of the US Army Missile Command, Redstone Arsenal, Alabama. This report discloses a high-speed arithmetic unit which provides computation for digital moving target indication. The digital moving target indicator is one of the elements of a digital signal processor for a phased array radar system.

SUMMARY OF THE INVENTION

The programmable signal processor is a combination of multipliers, adders, and memories capable of performing high-order MTI filtering at radar operating speeds. Various MTI algorithms for clutter cancellation and adaptive processing can be used. The processor utilizes a moving target indicator, a coefficient memory for the moving target indicator, a vector magnitude unit, a noncoherent integrator, a threshold detector, and a data transfer unit as an integrated assembly to provide target tracking functions. This allows selectable signal-to-clutter improvement of the moving target indicator filtering, the combination of in-phase and quadrature channel MTI residues, signal-to-noise improvement by noncoherent integration of the combined MTI residues, threshold detection, and data transfer to other related radar system circuitry.

Bipolar video signals from the receiver multiplexers of the radar system are input to analog to digital (A/D) converters for the in-phase (I) and quadrature (Q) channels. These continuous signals are sampled at a predetermined frequency rate, as for example 5 MHz, thus forming discrete range samples at selected intervals. Each sample is represented by a digital word and is composed of clutter, noise, and the desired target components.

As a subsystem of an array radar, the programmable signal processor offers a wide range of flexibility in the use of selectable MTI filters with the radar as well as flexibility in the evaluation of various MTI filter designs with the existing array radar. In a radar environment, clutter interference is caused by reflections from a variety of back-scatters. Although complete rejection of clutter is impossible, the signal processor is a viable tool for developing higher order filter designs to obtain maximum clutter suppression with increased target detectability.

Selectable MTI filter coefficients are stored in a programmable memory and can be modified as a function of beam position and range. This adaptive nature of the signal processor for real-time changing of filter frequency characteristics yields a unique feature in target tracking by providing the capability for immediate radar response to changing clutter situations. By selectively implementing separate filter characteristics for various range sectors, areas of high clutter interference such as rain clouds or large fixed reflectors can be isolated (FIG. 11). Once isolated, particular MTI filters ($MTI_1-MTI_4$) can be used in these range bins to provide maximum clutter attenuation. Similarly, filters providing increased target detectability can be implemented in regions of minimum interference. Range sectoring can then be performed on every radar beam position in the azimuth search sector with different range sectors used on each beam position.

DESCRIPTION OF THE PREFERRED EMBODIMENT

Figure 1:
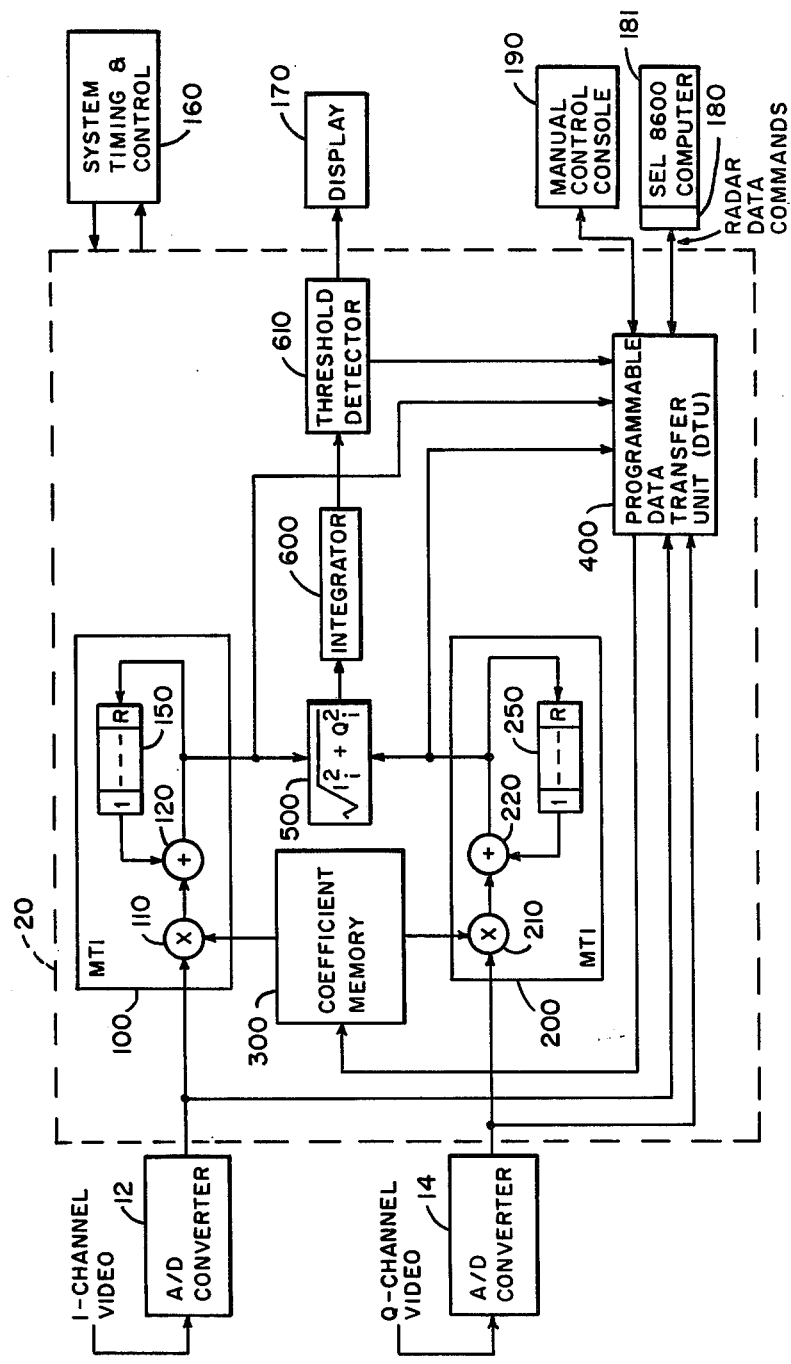
FIG. 1 is a simplified block diagram of a preferred embodiment of a programmable signal processor for interfacing with appropriate radar inputs and manual or computer control inputs.

Referring now to the drawings wherein like numbers represent like parts FIG. 1 discloses a preferred embodiment of the invention wherein the in-phase video signal (I) from the radar is coupled to an analog to digital converter 12 and the quadrature video signal (Q) is coupled into an analog to digital converter 14 for processing and coupling as respective digital signals to the signal processor 20. Signal processor 20 comprises moving target indicators 100 and 200, coefficient memory 300, data transfer unit 400, vector magnitude unit 500, integrator 600, and threshold detector 610. Moving target indicators 100 and 200 are identical each including a multiplier, adder and accumulator. In MTI 100 the output of multiplier 110 is coupled as an input to adder 120. The output of adder 120 is coupled as an input to accumulator 150 and as an output vector magnitude unit 500 and data transfer unit 400. Accumulator 150 has an output coupled back to adder 120. The output of converter 12 is coupled as an input to multiplier 110 and as an input to data transfer unit 400. Converter 14 is similarly coupled to the multiplier of MTI 200 and data transfer unit 400, with the output of the MTI 200 being coupled similarly as data of MTI 100. Coefficient memory unit 300 has an input from data transfer unit 400 and an output coupled to the respective multipliers 110 and 210 of the MTI's. The vector magnitude unit 500 has an output to integrator 600 wherein the signal is integrated and coupled to a threshold detector 610. Threshold detector 610 has an output coupled to indicator or display circuit 170 and an output coupled to the data transfer unit 400. Data transfer unit 400 is further interfaced with either a control computer 181 or with a manual control console 190.

Figure 2:
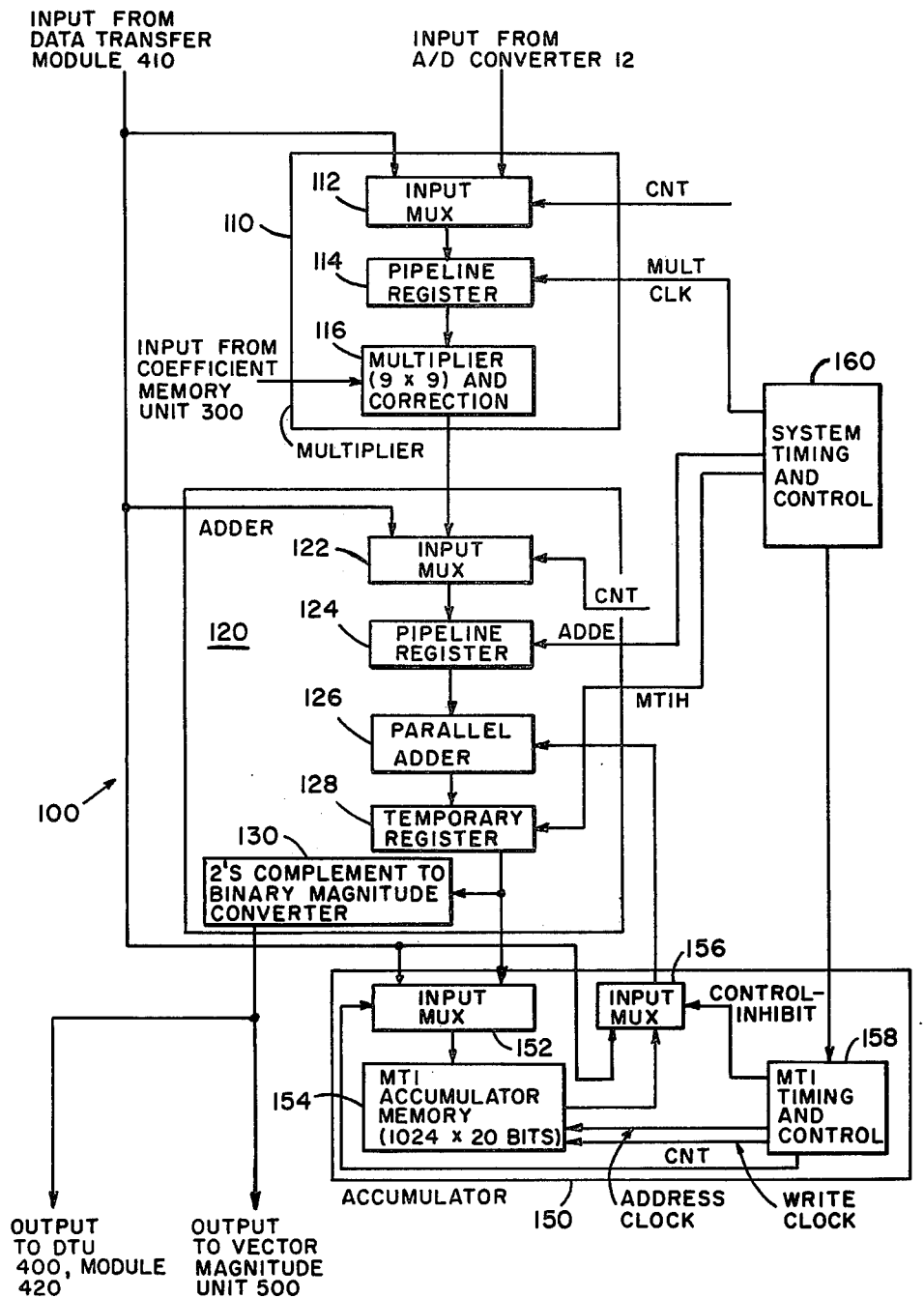
FIG. 2 is a simplified block diagram of the MTI circuit of the signal processor of FIG. 1, including a simplified diagram of the system timing and control circuit for the MTI.

Whereas FIG. 1 shows a simplified block diagram of the moving target indicator (MTI) filter circuit 100, FIG. 2 discloses a more detailed block diagram of the MTI filter. Since MTI filters 100 and 200 are identical the circuit connections for filter 100 are typical of the connections for both filters. Input signals from the analog to digital converter 12 into multiplier 110 are coupled into an input multiplexer (MUX) 112. Output signals from multiplexer 112 are coupled through a pipeline register 114 into a multiplier and correction circuit 116. The input signal from coefficient memory unit 300 is further coupled into multiplier circuit 116 for combination with the converter input signal. The output of multiplier 116 is the multiplier output which is coupled to an input multiplexer 122 of adder 120. The output of multiplexer 122 is coupled in series through a pipeline register 124, a parallel adder 126 and into a temporary register 128. The output of register 128 is coupled as the adder output to accumulator 150. An input multiplexer 152 receives the output from register 128 and couples this signal to a MTI accumulator memory 154. The signal output of accumulator memory 154 is coupled into a multiplexer 156 from which it is coupled back to parallel adder 126 of adder unit 120. Adder 120 further comprises a 2's compliment to binary magnitude converter 130 which also receives an output from temporary register 128 and provides an output to vector magnitude unit 500 and to data transfer unit 400.

Timing and control systems for radar transmitter and receiver systems and related systems wherein a sequence of events must follow a precise clocked interval are well established in the art. Typically, a timing and control system 160 is shown in FIG. 1 as being coupled to the signal processor without showing the detail of such coupling. FIG. 2 discloses the timing and control circuit 160 in the typical coupling to MTI filter 100. Timing and control outputs from system 160 are coupled to register 114, register 124, and temporary register 128. These timing and control signals control the timely advance of intelligence signals through the MTI system. Additional control signals CNT are coupled from the data transfer unit 400 to the system input multiplexers for loading the multiplexers prior to operation. To facilitate operation of the accumulator memory 154 and input multiplexer 156 of accumulator 150 an additional timing and control circuit 158 is included with the accumulator 150 and is synchronized by system timing and control circuit 160. The output of the MTI timing and control circuit 158 is coupled to accumulator memory 154 to provide write and address information thereto and the input to input multiplexer 156 from timing and control unit 158 provides a control (CNT) or inhibit function therefor.

Integrator 600 (not shown in detail) contains an adder and accumulator with circuitry substantially the same as adder 120 and accumulator 150 of the MTI filter. The only difference is that the output from the temporary register of the adder, which was coupled through a 2's compliment converter in the MTI, is coupled in the integrator as an output directly from the register to the threshold detector. Similarly, the system timing and control is substantially the same.

Figure 3:
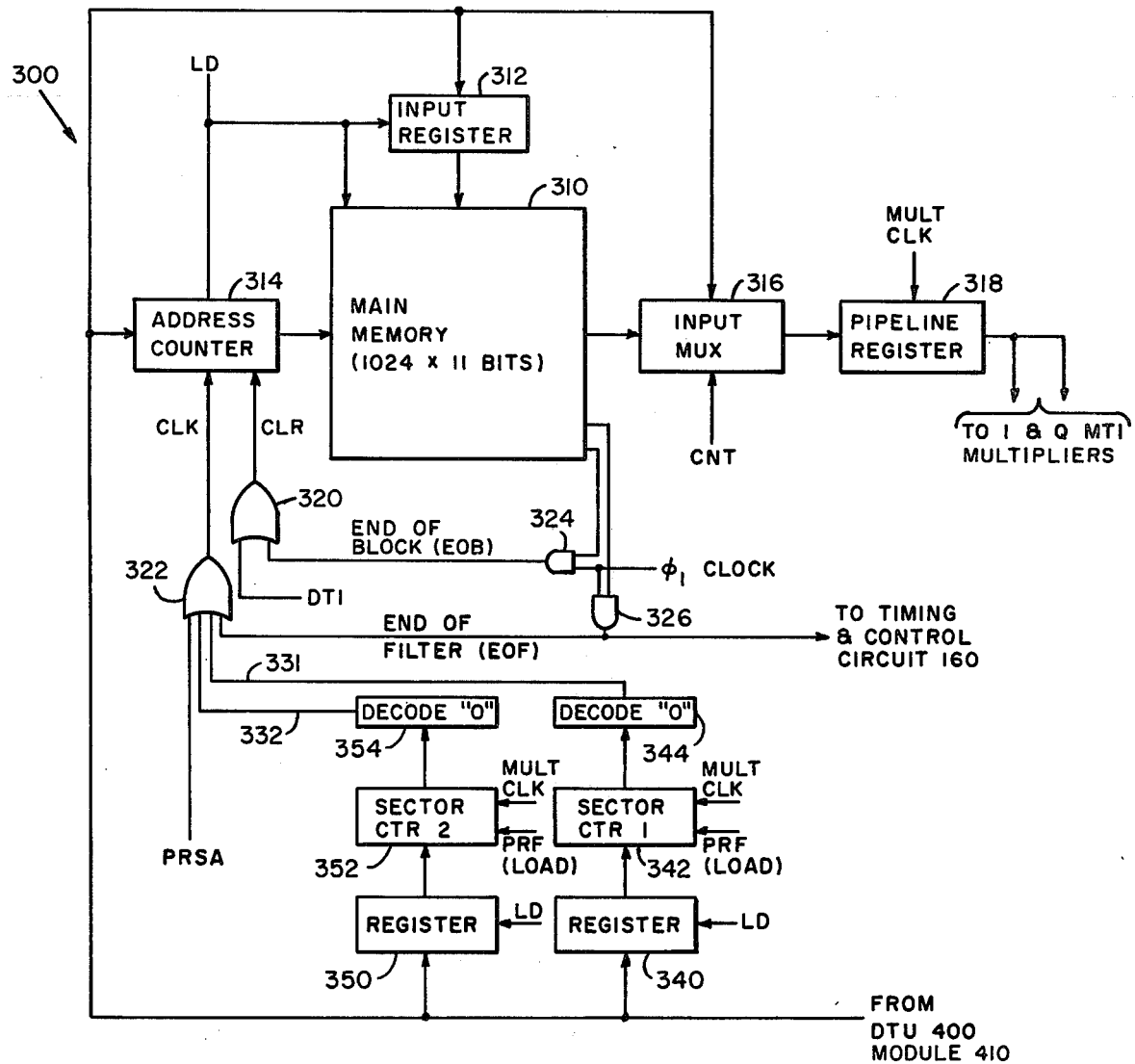
FIG. 3 is a block diagram of the MTI coefficient memory circuit.

As shown in FIG. 3, the coefficient memory unit 300 comprises a main memory circuit 310 with an input register 312 and an address counter 314 for the memory unit. Output signals from the main memory 310 are coupled through an input multiplexer 316 to a pipeline register 318. The output from pipeline register 318 is coupled as respective inputs to multipliers 110 and 210 of the MTI filters. OR gates 320 and 322 provide respective clear and clock inputs to address counter 314 for controlling the operation of the counter. AND gates 324 and 326 are coupled to receive respective outputs from the main memory and adapted to receive a clock input. At predetermined intervals output signals of gates 324 and 326 are coupled respectively as inputs to OR gates 320 and 322, and further provide a timing and control signal (EOF) back to timing and control unit 160. Additionally OR gate 322 has respective control inputs 331 and 332 coupled from first and second sector control circuits. The first sector control circuit comprises a register 340, a sector counter unit 342 and a decode circuit 344. The second sector control circuit comprises a register 350, a sector counter unit 352 and a decode unit 354 connected in series with the output of decode unit 354 being connected to input 332 of the OR gate and the output of decode unit 344 being connected to input 331 of the OR gate. The output from the data transfer unit to the coefficient memory unit provides inputs to register 340, register 350, address counter 314, input register 312 and input multiplexer 316. The system timing and control circuit is not shown, however timing and control inputs and outputs from timing and control circuit 160 are shown as an arrow input to the particular controlled circuit. Inputs CNT and LD (load) are supplied from data transfer unit 400 in response to computer or manual commands for preloading the system.

Figure 4:
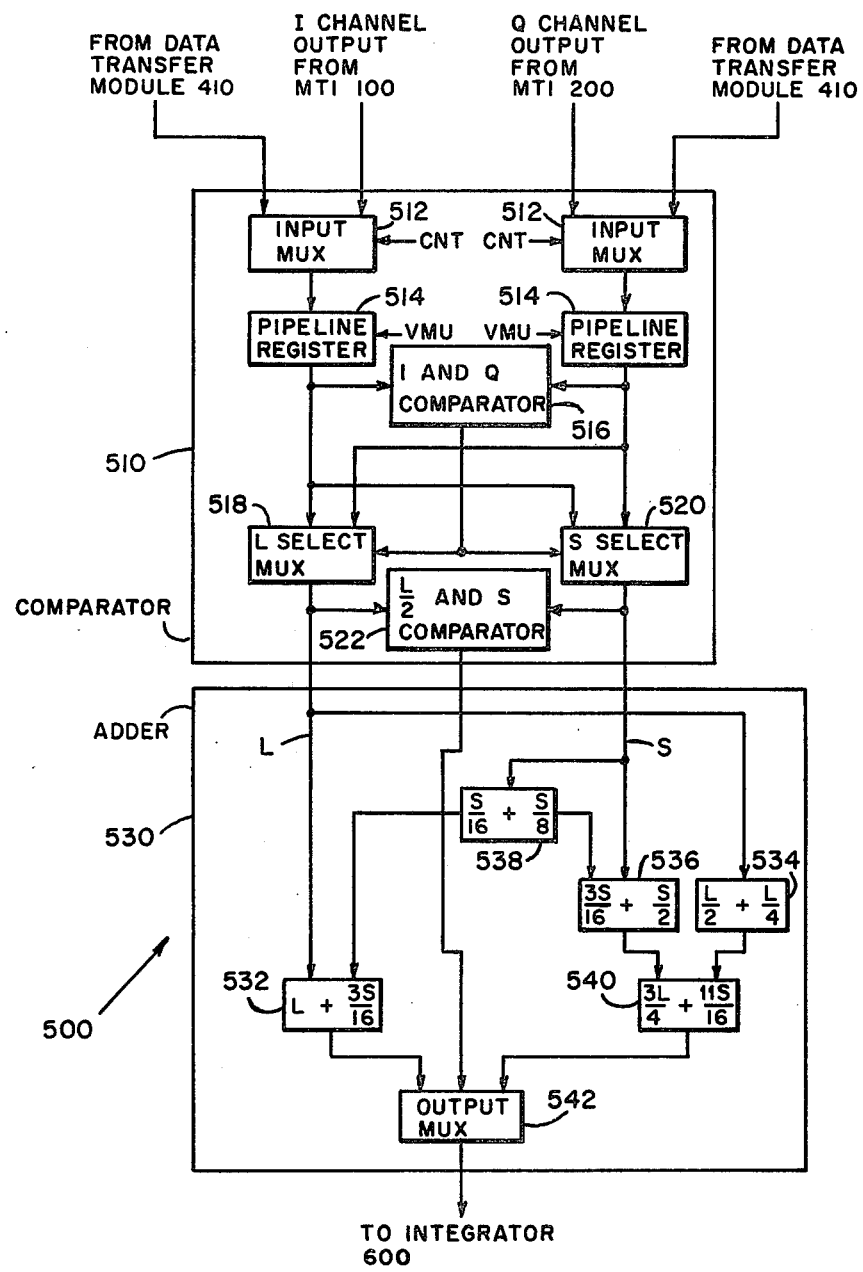
FIG. 4 is a block diagram of the vector magnitude unit circuitry which responds to the output of the MTI.

Vector magnitude unit 500 comprises a comparator and an adder as shown in FIG. 4. Comparator 510 includes parallel channel for comparing the processed in-phase video signal and the quadrature video signal from the respective MTI filters 100 and 200. Each channel comprises an input multiplexer 512 in series with a pipeline register 514. The output of each pipeline register 514 is coupled as inputs to an in-phase and quadrature comparator 516, to an L select multiplexer 518, and to an S select multiplexer 520. The L select and S select multiplexers merely indicate which multiplexer selects the largest of the two input signals applied thereto. The outputs of these two multiplexers are then coupled to a comparator 522 which compares $\frac{1}{2}$ L to S, that is one-half of the magnitude value of the largest signal is compared with the magnitude of the smallest signal. The outputs of multiplexers 518 and 520 are then further coupled into adder 530. The output of multiplexer 518 is coupled to a summing circuit 532 and to a summing circuit 534 within adder 530. The output of multiplexer 520 is coupled to a summing circuit 536 and a summing circuit 538 within adder 530. Summing circuit 532 performs the addition L+3/16 S, summing circuit 534 performs the addition L/2+L/4, summing circuit 536 performs the addition 3/16 S+S/2, and summing circuit 538 performs the addition S/16+S/8. The output of summing circuit 538 is further coupled as an additional input to summing circuit 532 and as an additional input to summing circuit 536. Outputs from summing circuits 534 and 536 are coupled as inputs to a summing circuit 540 which performs the addition of $\frac{3}{4}$ L+11/16 S. The outputs of summing circuit 532 and 540 are coupled as inputs to an output multiplexer 542, with the output of multiplexer 542 being coupled as the vector magnitude unit output to integrator 600. A control output from comparator 522 is further coupled to output multiplexer 542 for gating multiplexer 542 to provide the selected output algorithm. An output from comparator 516 is coupled to multiplexers 518 and 520 of comparator 510 for gating or inhibiting the input signals from registers 514 to assure acceptance of the correct input signal. Appropriate timing and control signals are coupled from the timing and control circuits to the vector magnitude unit as indicated by the arrow inputs. Input signals from the data transfer unit are entered into multiplexers 512. This input indicates an alternative method for supplying representative signal energy into the input multiplexers in a laboratory or related type of environment for calibrating or processing a signal wherein it is desired to bypass other signal processing circuitry.

Figure 5:
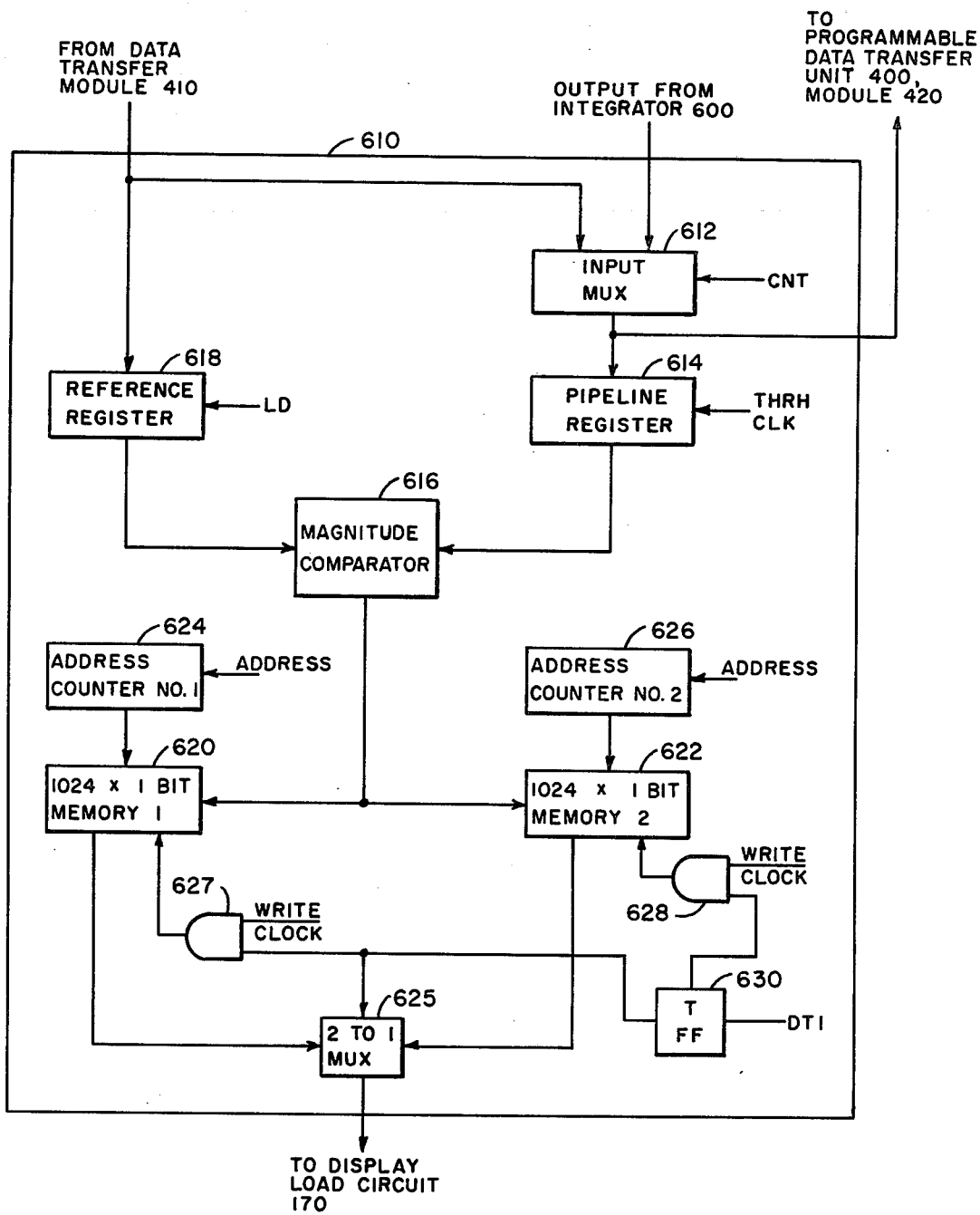
FIG. 5 is a block diagram of the threshold detector circuitry.

FIG. 5 discloses the threshold detector circuitry 610 which receives the output from integrator 600 and processes the output to provide a display signal for load circuitry. The output from integrator 600 is coupled into an input multiplexer 612. The output of multiplexer 612 is coupled to the data transfer unit 400 and within the threshold detector 610 to a pipeline register 614. A signal magnitude comparator 616 receives an output from pipeline register 614 and an output signal from a reference register 618, compares these signals and provides an output signal to respective memory circuits 620 and 622. Address counters 624 and 626 have outputs coupled to respective memories 620 and 622, addressing the memories. Outputs from memories 620 and 622 are coupled to a multiplexer 625, which provides the output to the display load circuit. AND gates 627 and 628 have respective outputs coupled as inputs to memory 620 and memory 622 for alternately coupling write clock signals thereto. Controlling inputs for the AND gates comes from a triggered flip-flop 630 which has one output coupled as an input to AND gate 628 and the other output of flip-flop 630 is coupled as a controlling or gating input to AND gate 627 and to multiplexer 625. Timing and control inputs from the timing and control circuits are shown coupled to the particular circuits requiring such input for synchronous operation such as the write clock input to AND gates 627 and 628 and the periodic data timing interval (DTI) input which triggers flip-flop 630. An input to reference register 618 and input multiplexer 612 is coupled from DTU 400 for providing computer or manual control console access to the detector and for changing the threshold detector reference level.

Figure 6:
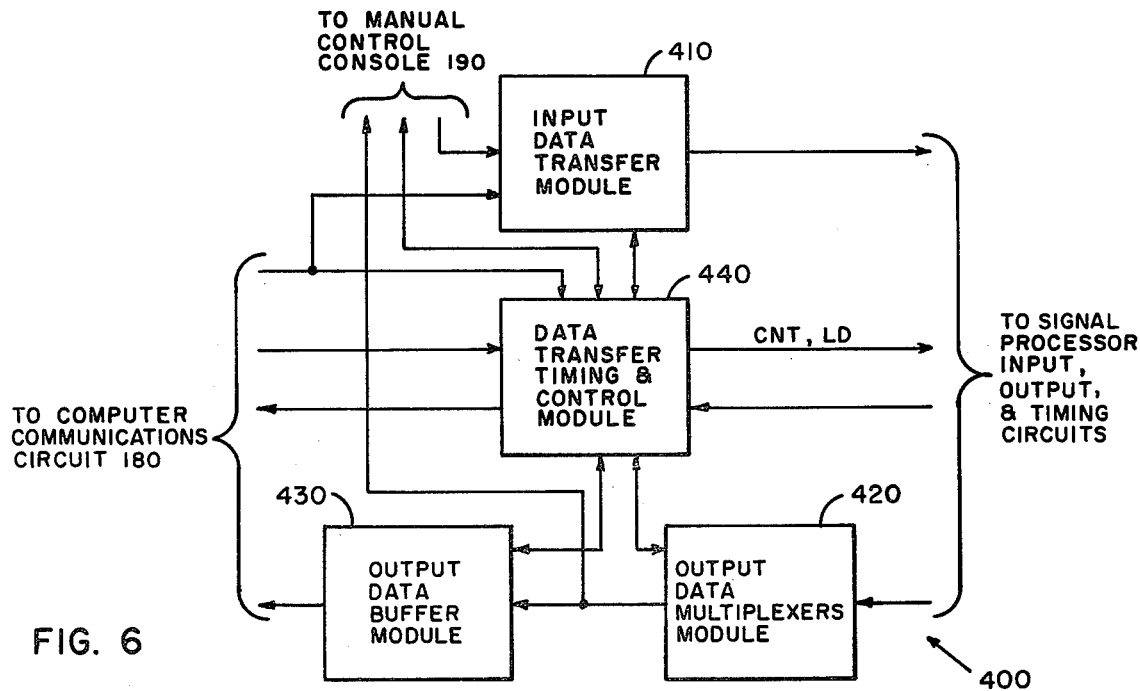
FIG. 6 is a block diagram of the data transfer unit of the signal processor unit which interfaces with both the array radar converters and with the manual console or control computer.

As shown in FIG. 6 data transfer unit 400 comprises an input data transfer module 410, an output data multiplexer module 420, an output data buffer module 430, and data transfer timing and control module 440. Input and output data from the other circuit components of the signal processor are coupled into and out of the respective modules 410 and 420 for processing. Multiplexer module 420 receives output data from the MTI circuits and the threshold detector. Output data from the multiplexer module is coupled to an output data buffer module 430 prior to coupling or interfacing with control computer communications circuit 180. Output data from multiplexer 420 is further coupled to provide an input for the manual control console 190 for providing output data thereto. The input data transfer module 410 is adapted to receive input signals from the manual control console or from the control computer for controlling the flow of data into the signal processor for loading data into the individual circuits such as the input multiplexers. Data transfer timing and control module 440 has inputs and outputs coupled to respective signal processing components 410, 420, and 430. Data transfer timing input/output circuits are adapted for receiving and transferring information to the manual control console and to the control computer so that either one can provide the signal processor control. Control (CNT) and load (LD) timing inputs are coupled from module 440 to processor circuits such as input multiplexers and registers when initially loading data from the manual console or control computer. The data transfer timing and control module 440 is similar in operation to and synchronized with system timing and control unit 160.

Figure 7:
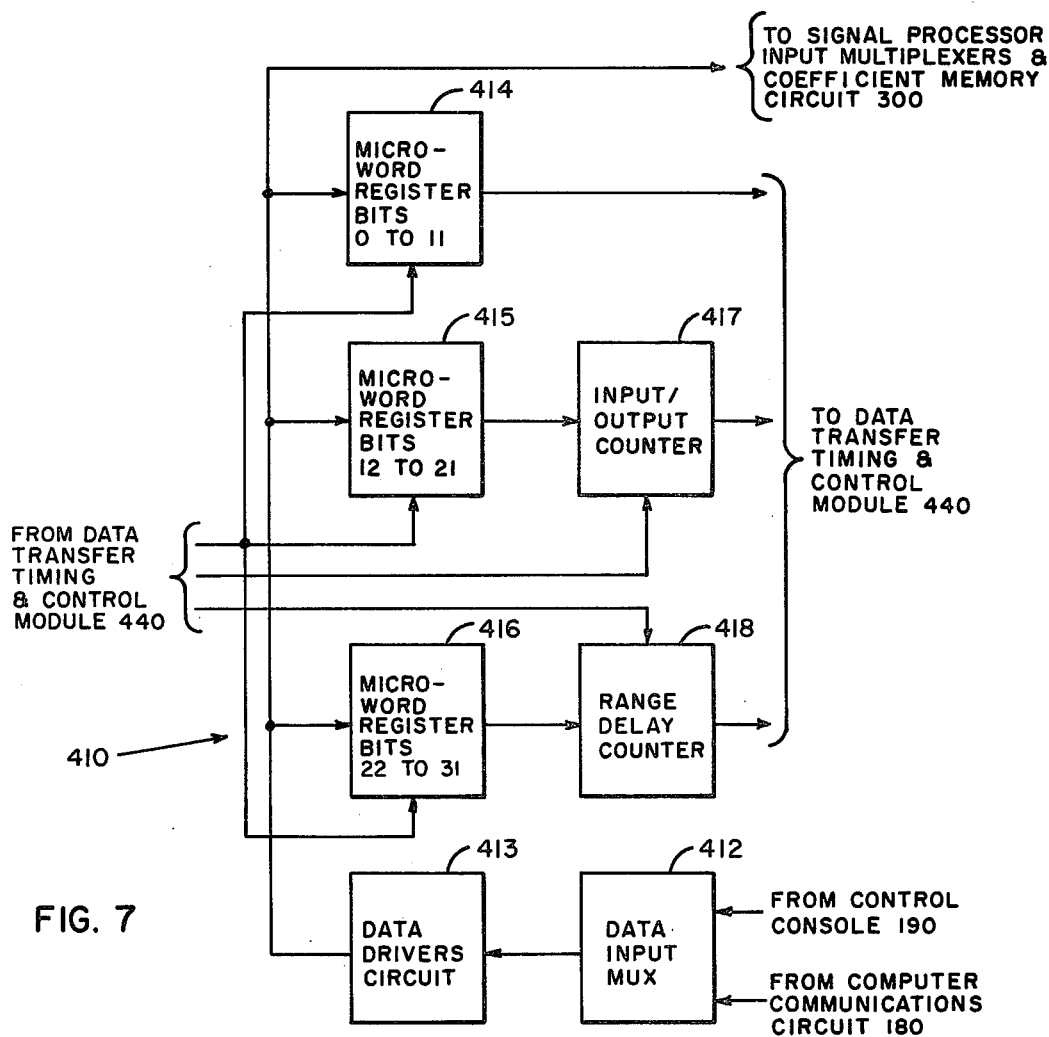
FIG. 7 is a block diagram of the input data transfer module of FIG. 6.

As shown in FIG. 7, the input data transfer module 410 of data transfer unit 400 comprises a data input multiplexer 412 which receives inputs from either the manual control console or the computer communications module for controlling operation of the programmable data processor. The output signal from input multiplexer 412 is coupled as an input to data driver circuit 413 which provides output bits to microword registers 414, 415, and 416 and provides output signals to other signal processor components such as coefficient memory 300 as shown in FIG. 3, MTI 100 as shown in FIG. 2, threshold detector 610 as shown in FIG. 5, and to vector magnitude unit 500 as shown in FIG. 4. The output from microword register 414 is coupled directly to the data transfer timing and control module 440. The output of microword register 415 is coupled to an input-output counter 417, with the output of counter 417 being coupled back to data transfer timing and control module 440, and the output of microword register 416 is coupled as an input to a range delay counter 418, with the output of delay counter 418 being coupled to module 440. The microword register, input/output counter, and range delay counter receive timing input signals from the data transfer timing and control module 440 and provide the appropriate output signals therefrom indicating the status of input data prior to transfer of the signal to other signal processor circuitry.

Output data multiplexers module 420 comprises first and second buffer memory multiplexers (not shown), the first having a multiplex ratio of 16 to 1 and the second having a multiplex ratio of 2 to 1 for passing intelligence signals from the signal processor circuitry into the output data buffer module. Multiplexer address control signals from the data transfer timing and control module 440 controls the operation of this module.

The output data buffer module 430 comprises a parallel pair of output data buffer memory units (not shown) which receive the input signals from the multiplexer modules 420 and provide output signals in response thereto to an output multiplexer (not shown) coupled to provide an output signal to the control computer. Timing and control logic (not shown), local to the data buffer module 430 controls operation of the respective buffer memories and the output multiplexer, and is coupled to data transfer timing and control module 440 to maintain synchronization of this output unit with other timing in the system.

Data transfer timing and control module 440 includes a synchronization logic circuit which receives timing inputs from other data transfer unit modules and provides timing outputs to other data transfer unit modules for providing synchronization in the timing. The output signals from microword register 414 (FIG. 7), is coupled as inputs to mode logic, output multiplexer control logic, and data input decoder logic circuits of the data transfer timing and control module. The mode logic circuitry provides output signals to the manual control console. The output multiplexer control logic of the control module 440 provides control signals to the output data multiplexer module 420. The data input decoder logic of control module 440 provides control signals (CNT) to the signal processor.

Figure 8:
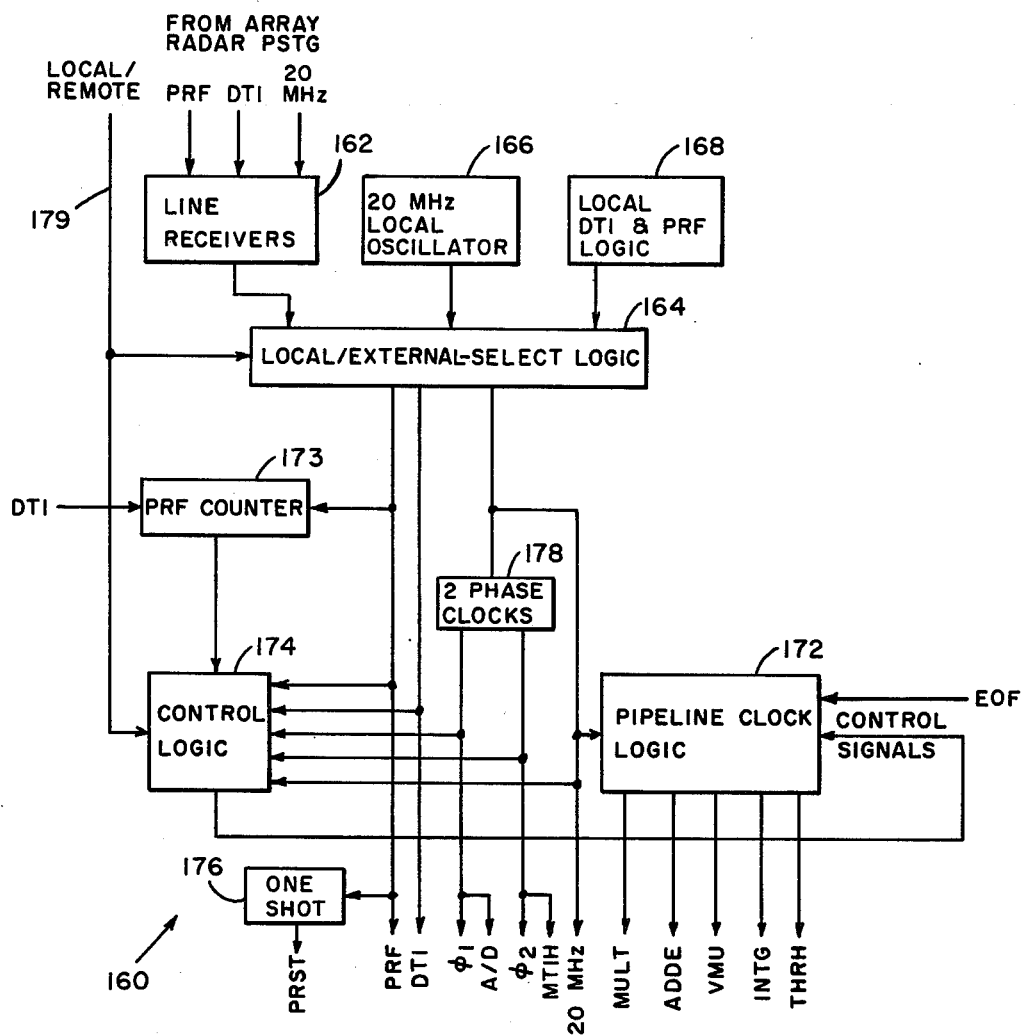
FIG. 8 is a detailed block diagram of the system timing and control circuit.

The signal timing and control circuit 160, as shown in FIG. 8 in block diagram, receives timing input signals from the radar programmable system timing generator (PSTG), including the pulse repetition frequency (PRF) data timing interval (DTI), and a 20 MHz signal. This incoming data is received by respective line receivers 162 and coupled to a logic selection circuit 164. A 20 MHz local oscillator 166 and a local DTI and PRF logic circuit 168 provide additional input to logic selection circuit 164. Outputs from the logic selector circuit 164 include the data timing interval output (DTI), the pulse repetition frequency output (PRF) and the 20 MHz reference signal output. The 20 MHz frequency output is additionally coupled to a pipeline clock logic circuit 172 which provides multiplier (MULT), adder (ADDE), vector magnitude unit (VMU), integrator (INTG), and threshold detector (THRH) output logic signals. A pulse repetition frequency counter 173 and a control logic circuit 174 are coupled to receive the PRF output, with the output of the PRF counter 173 also being coupled as an input to control logic circuit 174. A one shot multivibrator is also coupled to receive the PRF output of select logic circuit 164 to provide a PRST (preset) output signal. Clock 178 receives the 20 MHz output signal from logic circuit 164 and provides two clocked outputs phased apart by a preselected interval as for example 180° apart indicated as $\phi_1$ and $\phi_2$. Additional inputs to control logic circuit 174 include the DTI output and 20 MHz output of logic circuit 164, the $\phi_1$ and $\phi_2$ clock outputs from clock 178 and a local/remote input 179. The control logic output is coupled to the pipeline clock logic circuit 172 for providing control signals thereto. Local/remote input 179 is merely a switching input, which may come from the manual control console, for selecting either computer control or manual control for the system. Local/remote input 179 is also coupled to logic circuit 164. Logic circuit 164 provides an OR gate function for selecting local inputs from oscillator 166 logic circuit 168 or the remote PSTG inputs. Local/remote input 179 merely selects the option.

The programmable signal processor is capable of performing high-order MTI filtering at radar operating speeds. Various MTI algorithms for clutter cancellation and adaptive processing can be implemented, changed algorithms can be elevated, and performance criteria can be established for future missile system applications. The processor is capable of performing signal-to-clutter improvement with the programmable MTI, combination of in-phase and quadrature channel MTI residues, signal-to-noise improvement by noncoherent integration of combined MTI residues, threshold detection, and data transfers to other radar system hardware elements.

Bipolar video signals from array radar receiver multiplexers are input to A/D converters 12 and 14 for the in-phase (I) and quadrature (Q) channels. These continuous signals are sampled at a 5-MHz rate for example, thus forming discrete range samples at 30 meter intervals. Each sample is represented by a digital word and is composed of clutter, noise, and target components.

Clutter components are suppressed with MTI digital filters 100 and 200 providing bandstop characteristics for attenuation of fixed or slow moving clutter and bandpass characteristics to pass all signal components associated with targets of interest. Nonrecursive fixed-window digital filters of order N implement the MTI function, wherein $$y_i(kNT) = \sum_{n=0}^{N-1} C_n x_i(kNT - nT); \quad (1)$$

where
 $i = 1, 2, \ldots, R$
 $k = 1, 2, \ldots, K$
and N is the number of samples required to generate each output value; the higher the N, the better the characteristic curve output. Although these MTI filters must be implemented for all R radar range bins, a fixed-window filter implementaton requires that only one output be calculated every NT second, where $T=1/\text{PRF}$.

Figure 9:
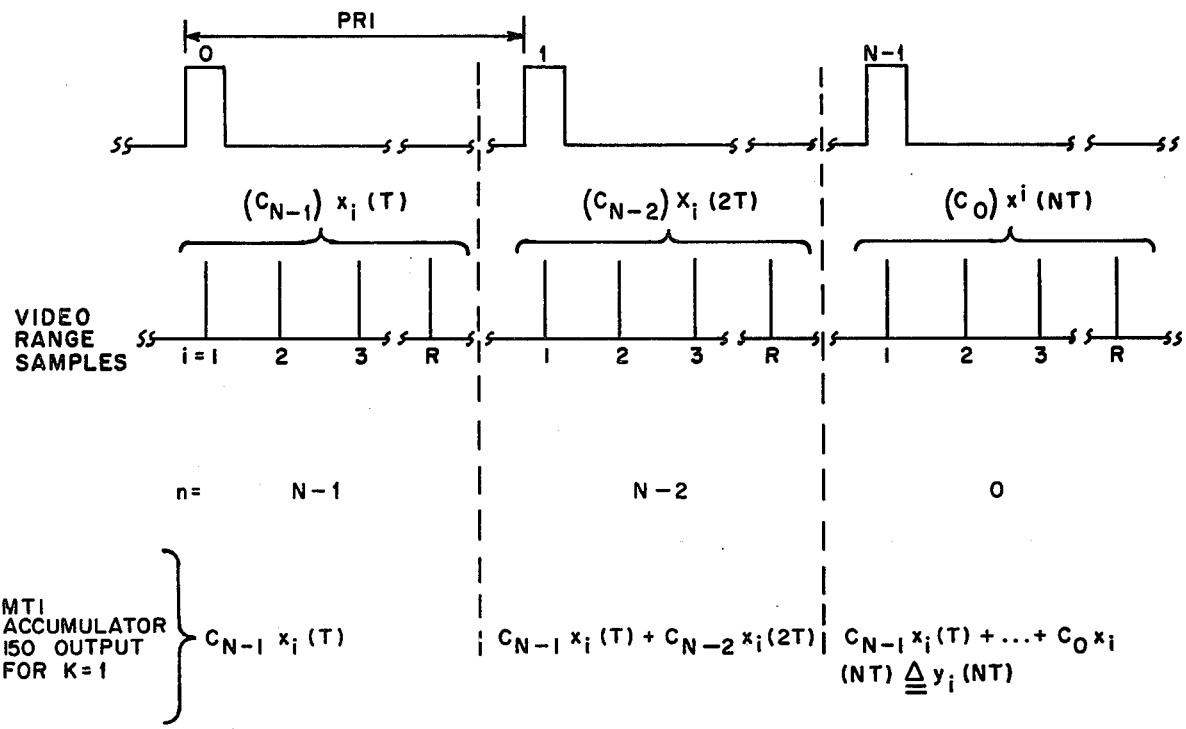
FIG. 9 discloses a typical timing sequence for a fixed window MTI.

FIG. 9 discloses the fixed-window MTI process for a multiple range bin system. The partial sums of the MTI accumulator are only for $k=1$. The range bins are numbered from 1 to R and MTI outputs are numbered from 1 to K. Multiplier coefficients $C_n$ are numbered from 0 to $N-1$. At the beginning of a beam dwell and during the first PRI, video range samples from each range bin denoted by $x_i(T)$ are weighted with the appropriate filter coefficient $C_n = C_{N-1}$. During the next interval, the digital samples denoted by $x_i(2T)$ are weighted with $C_{N-2}$ and added to the previous value to form a partial sum. This process continues for each PRI until N-weighted samples have been summed to form the desired MTI output $y_i(NT)$ for each range bin within that $N^{th}$ PRI. In each DTI, K sequences are repeated.

Each MTI 100 and 200 will output a processed sample every NT second to VMU 500 for combination.

$I_i \triangleq y_i(kNT)$ is the I-channel or output sample from MTI 100 and $Q_i \triangleq y_i(kNT)$ is the Q-channel or output sample from MTI 200.

A perfect vector magnitude would perform $\sqrt{I_i^2 + Q_i^2}$; however, because of the complexity of implementing this function, a satisfactory approximation algorithm is implemented in VMU 500. Consequently, $I_i$ and $Q_i$ outputs are combined according to $$Y_i(kNT) \triangleq \begin{cases} L_i + 3S_i/16 & \text{for } S_i/L_i \leq 0.5 \\ 3L_i/4 + 11S_i/16 & \text{for } S_i/L_i > 0.5 \end{cases} \quad (2)$$

where $L_i$ = the large or maximum $|I_i|$, $|Q_i|$ and $S_i$ = small or minimum $|I_i|$, $|Q_i|$.

The VMU outputs $Y_i(kNT)$ are then clocked to a noncoherent integrator 600 for improvement of signal-to-noise ratios. The integrator accumulates the quantity (K) of VMU outputs each DTI for all R range bins as shown in the equation $$INT_i = \sum_{k=1}^{K} Y_i(kNT) \quad i = 1, 2, ..., R. \quad (3)$$

After the last PRI, or $K^{th}$ integration, $INT_i$ is compared to a preset reference threshold in threshold detector 610, and an alarm bit is produced for each range bin where this sum exceeds the threshold. The alarm bits are used to indicate threshold crossings, as for example, B-scope display and to control transfer of processed data (viz., $INT_i$ values) to the computer or to a manual control console.

The programmable data transfer unit (DTU) 400 functions as a multimode interface for data communications between the PSP (Programmable Signal Processor) and the control computer or manual control console. Control commands generated by the computer establishes a predefined mode (i.e., search, track, measurement, loading, or diagnostic) of operation for the data transfer unit. Subsequent data transfers furnish the control computer or the signal processor with the necessary information for performing the selectable algorithms associated with the radar operation. Typical data transfers are video clutter measurements, resulting MTI residues, and processed track data to the computer or filter coefficients to the signal processor.

The MTI filter coefficients are stored in programmable memory 300 and can be modified as a function of beam position and range. The adaptive nature of the signal processor for real-timne changing of filter freqency characteristics yields a unique capability of changing the filter response as the field of clutter varies. This involves partitioning the total range coverage into one, two, three range sectors for a given radar beam position and implementing separate filter characteristics for each sector. Consequently, areas of high clutter interference, such as a rain cloud (FIG. 11) can be isolated. Once isolated, particular MTI filters can be used in these range bins to provide maximum clutter attenuation. Similarly, filters providing increased target detectability can be implemented in regions of minimum interference. Range sectoring can be performed on every radar beam position in the azimuth search sector with different range sectors used on each beam position.

The A/D converters 12 and 14 of the PSP convert bipolar video radar returns to a suitable binary format for digital processing. The output format is an offset binary code. The offset binary code is converted to 2's complement by the MTI (adder 120) for additional processing simply by inverting the sign bit.

For the particular case where the binary number which represents the largest negative number is an invalid 2's complement number because it has no positive counterpart, it is eliminated as an input to the PSP by adding binary ONE to the least significant bit each time it occurs, thereby producing a valid 2's complement number. This logic is performed by multiplier and correction circuit 116 (FIG. 2) for the I (in-phase) channel and by an identical circuit in MTI 200.

The multiplier module 110 includes 9×9 bit sign-magnitude multiplier 116 with correction circuitry necessary to form the 2's complement digital output. The 2's complement output product, P, is formed by the following summation:

$$P = (XY) + (Y_s\overline{X}) + (X_s\overline{Y}) + (X_s + Y_s) \quad (4)$$

where X and $X_s$ (Y and $Y_s$) are magnitude and sign, respectively, of the multiplier (multiplicand). $\overline{X}$ denotes the complementation of X. All of the terms following the XY product are correction terms for forming a correct 2's complement product. The sign of the product is formed separately by an exclusive OR $$P_s = (X_s) \oplus (Y_s) \quad (5)$$

If either the multiplier or multiplicand is zero, $P_s$ is forced to a positive value.

The parallel adder 126 and memory 154 of the accumulator functions as an accumulator for processing multiplier outputs. During a PRI, data from the multiplier is added to the contents of the accumulator memory and the results restored (as they are produced) back into memory. However, memory outputs during the first PRI for each N-pulse group are inhibited to insure initial samples are stored without modification. This process continues throughout the DTI with R-valid outputs produced once every N PRI. Valid MTI outputs are reformatted to binary magnitude in converter 130 before they are transferred to the VMU 500.

Internal control of data flow is performed by MTI timing circuits synchronized with the system timing circuit. Lines denoted as CNT and LD for all signal processor circuits are active during either manual control or computer loading and diagnostic sequences.

The MTI coefficient memory unit 300 is shown in FIG. 3. This particular circuit provides the PSP 20 with flexible signal processing capability. The main memory and address counter are used as a nine-bit parallel shift register to clock coefficients to the I and Q channel MTI multiplier inputs under control of various selectable options. For the simplest mode of operation, the memory circuit 310 will output a single filter coefficient $C_n$ to the I and Q multipliers 100 and 200, each PRI, will alert the PSP (after each cycle through N coefficients) at the end of filter processing (EOF) that respective MTI outputs are ready for VMU 500 processing, and repeat the cycle K times. However, the flexibility of the memory circuit extends the processing capabilities to more complicated algorithms. Options available through proper loading of the memory 310 circuit include sectoring of the R-range bins into two or three regions for processing of each by a different set of coefficients, that is by different MTI filtering; varying the filter order and coefficient set within a DTI; and repeating blocks of coefficients within a DTI as desired. By combining these options, the PSP can perform a variety of signal processing tasks, including range adaptivity, pulse-to-pulse PRF stagger, or block-to-block PRF stagger.

The VMU 500 to implement Equation (2) is shown in FIG. 4. The I and Q channel values, $Y_i(kNT)$, are first input to a magnitude comparator 516 and selection multiplexer 518 and 520 to determine which is the large (L) and which is the small (S) signal. Once L and S are determined, they are sent to appropriate shifting and adding circuits in adder 530 to calculate $L+3S/16$ and $3L/4+11S/16$. Finally, $L/2$ and S are compared to determine which of the two calculated approximations to route to the integrator.

Because $L+3S/16$ and $3L/4+11S/16$ require division, their implementation is performed digitally by right shifts and adds. Therefore, $$3S/16 = S/16 + S/8$$

and is accomplished in adder 538, where $S/16$ and $S/8$ are four- and three-bit shifts of S, respectively. Similarly, $$11S/16 = 3S/16 + S/2$$

and is accomplished in adder 536, where $3S/16$ is already available and $S/2$ is a one-bit shift; and $$3L/4 = L/2 + L/4$$

(accomplished in adder 534) where $L/2$ and $L/4$ are one- and two-bit shifts of L. These outputs are added appropriately to obtain the approximation of equation (2).

Following VMU 500 in signal processor 20 and providing the system signal-to-noise gain is the integrator 600 [defined by equation (3)] which simply accumulates K VMU outputs during a DTI. The integrator consists of parallel adder and memory modules, which is identical functionally with the MTI accumulator as noted hereinabove. The VMU outputs for R-range bins are integrated noncoherently during a DTI and passed to the threshold detector unit 610.

The threshold detector 610 compares the integrator outputs, $INT_i$, to a preset threshold. Depending on the results of the comparison, a target alarm bit is either set to a ONE if the threshold is exceeded (target present), or reset to ZERO (no target) in one of two available memories 620 and 622. While one memory is being used to store alarm bits for the current DTI, the other memory will be transferring bits producing during the previous DTI to the radar display 170.

All major timing signals for the signal processor originate from timing circuit 160 as shown in FIG. 8. This module consists of the digital logic necessary for data control and sequencing for each section of the PSP. All external timing commands from the array radar relating to PSP operation enter the timing circuit and are subsequently distributed throughout the entire system.

Figure 10:
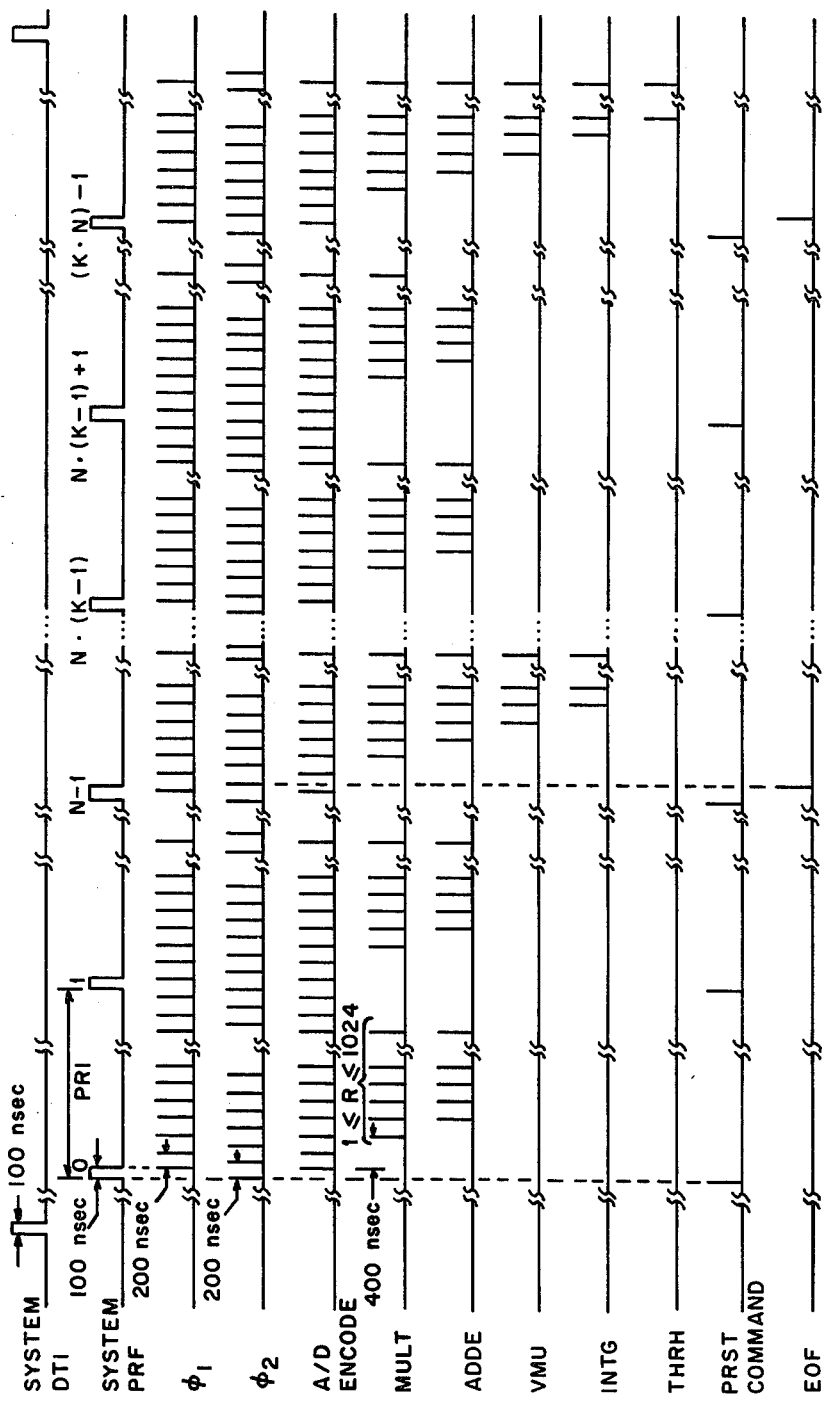
FIG. 10 is a typical timing sequence for the signal processor as provided by the timing and control circuit of FIG. 8.

Inputs from the array radar PSTG include the PRF, DTI, and 20-MHz system clocks. These clock inputs enter the timing logic through line receivers 162, and are used either directly or indirectly for initialization and data sequencing as shown in FIGS. 10 and 12–14. There are two major timing cycles for the signal processor as shown in FIGS. 8 and 10, the DTI cycle which is controlled with a PRF counter 173, and the PRI cycle which is controlled with a master range bin counter. The PRF counter 173 is reloaded with the value K·N by the system DTI pulse and clocked down by the system PRF. When the contents of the counter reaches zero, counter 173 signals the PSP control logic 174 that processing is complete for that particular beam position. The master range bin counter is an address counter (not shown) for the MTI accumulator memory 154 located in the MTI timing and control section 158 of FIG. 2. It is reset to zero by a derivative of the system PRF clock (the PRST pulse) and clocked by a derivative of the 20-MHz clock (the MULT signal). When the contents of the master range bin counter reaches R+3 all operation in the PSP cease. At that time, all R range bins have been processed for one PRF and the processor is in a hold status until the next PRF pulse which restarts the PRI cycle (pulse repetition interval). Numerous other timing signals occur within each of the PRI cycles as illustrated in FIG. 10. FIG. 10 also shows the system DTI and PRF signals with their relationship to a typical 5-MHz Phase 1($\phi_1$) and Phase 2($\phi_2$) clocks which are derived from the 20-MHz signal and used throughout the PSP hardware for register and memory control functions. To control data flow through the PSP pipeline (MTI multiplier, MTI accumulator, VMU 500, integrator and threshold detector) the $\phi_1$ clock functions as a universal data strobe. The series of clocks in FIG. 10, beginning with the MULT clock through THRH clock, are derived from the $\phi_1$ signal to provide input register control for each stage of the system pipeline.

A complete system reset and initialization is performed by the system DTI signal with a separate PRST command providing selected reset functions necessary during a DTI. After system initialization by either signal, an A/D encode command is given to converters 12 and 14 to sample the radar video returns. After a 400-nsec delay to account for throughput delays associated with the A/D converter, the digitized video is transferred to the I and Q MTI multipliers using the MULT clock. These products are passed to the MTI accumulator using the ADDE clock. At the beginning of the $N^{th}$ PRI (defined by the EOF command), MTI data for each channel is transferred through the VMU to the integrator using VMU and INTG clocks. Finally, after $(K \cdot N) - 1$ PRI, the integrated data are transferred to the threshold unit by THRH.

Although all major timing and control signals are generated in the timing circuit 160, portions of the PSP including the MTI, coefficient memory, integrator, and threshold detector require more sophisticated timing functions than provided by the system timing card. Thus, separate but similar timing logic is incorporated into each of these modules to provide the necessary signals required to execute a particular control sequence.

Figure 12:
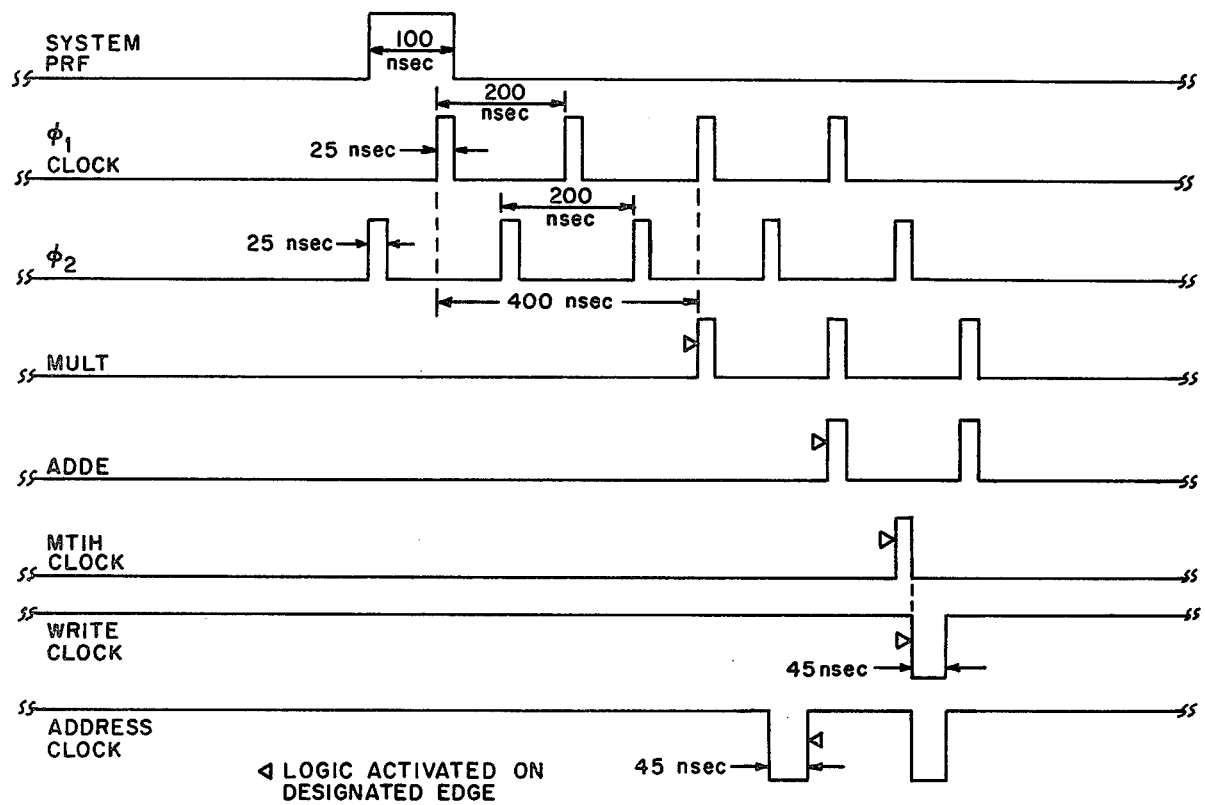
FIG. 12 is a typical timing sequence for the MTI.

Typical of this separate timing logic is the timing sequence for register control and memory read/write operations for the MTI circuits as shown in FIGS. 12 and 10. After the 400-nsec delay, A/D converter throughput data are strobed into the multiplier 116 (MULT). Then after multiplication is complete, the product is transferred (leading edge of ADDE) to the parallel adder 126 in the MTI pipeline where it is added to the previously stored residue, thus forming a new residue. For the first PRI in each N-pulse group, products are stored unaltered. When the addition is complete, data are transferred into temporary register 128 on the leading edge of the MTIH clock in preparation for a memory write sequence. The address logic for memory 154 consists of a counter and address register, therefore, the memory address must be incremented one clock cycle prior to the write sequence. Hence, after data in the temporary register are written into memory (WRITE clock), the address register is loaded with a new address and the address counter is simultaneously updated (ADDRESS clock). On completion of the write, new data are accessed from memory and the process reiterated for the next range bin.

Figure 11:
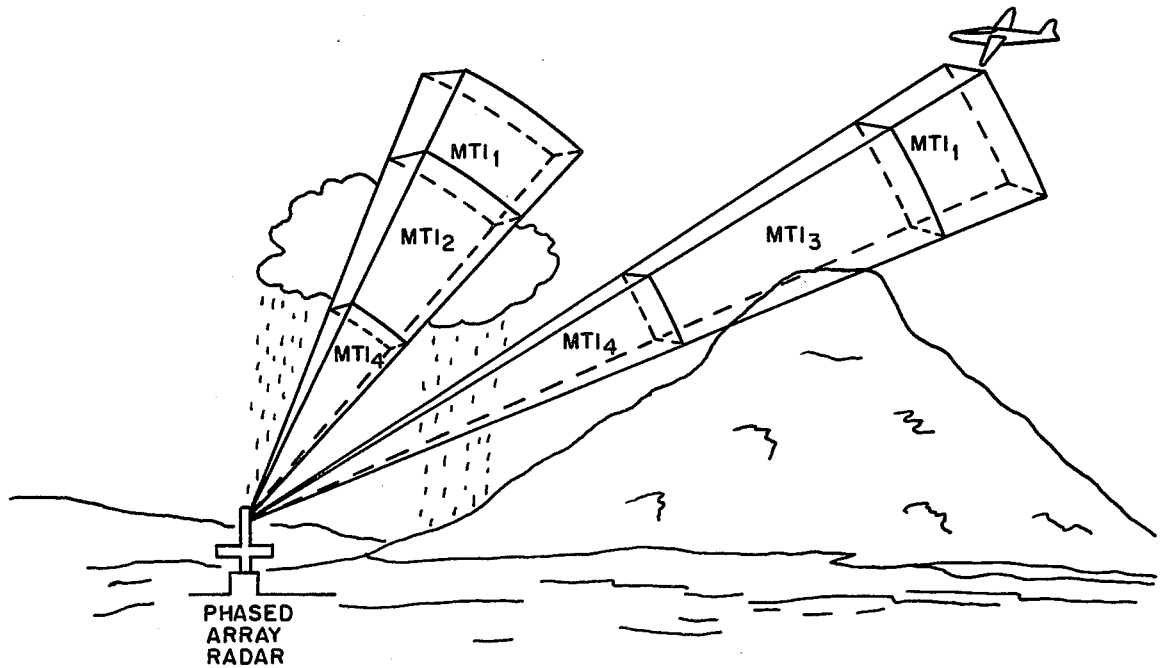
FIG. 11 is a diagrammatic view of two range sectors with selectable MTI filtering shown as a function of the range sector and radar beam position.

The coefficient memory circuit of FIG. 3 can be configured to implement numerous combinations of the MTI options previously described as shown in FIG. 11. For a typical memory configuration it is assumed that initialization and loading of the coefficient memory circuit are complete and that the unit is ready for real-time operation. The number of processed range bins are assumed to be R=1000, with the first three bins processed different from the remaining 997. That is, there are two range bin sectors for the example DTI with an $MTI_1$ containing multiplier coefficient denoted as $C_{n1}$ (where n=N−1, N−2, ..., 0 for the first sector) and $MTI_2$ with $C_{n2}$ (where n=N−1, N−2, ..., 0 for the second). Two different filters are being implemented, with both having the same order N. The range sectors must always have filters of equal order because of the main memory organization. However, the filter order can be changed within the DTI simultaneously for all sectors. After transmitting N pulses and processing the returns with the coefficient set $C_{n1}$, $C_{n2}$; n=N−1, N−2, ..., 0; returns from the next M transmissions are processed with the set $B_{n1}$, $B_{n2}$; n=M−1, M−2, ..., 0, which defines a new $MTI_1$ and $MTI_2$ of order M. The two sets of coefficients are alternated until (N+M)K/2 pulses have been transmitted, thus completing the DTI. When the DTI is completed, K-processed pulses will have been integrated for each range bin of each of the two range sectors. The proper load of these coefficients into main memory 310 of coefficient memory circuit 300 is illustrated in Table I. Bits 10 and 11 of "0" value must be appended to each of the nine-bit coefficients, an end of filter (EOF) word with bit 10 set to "1" must precede the last coefficient in each set of N (or M), and an end of block (EOB) word with bit 11 set to a "1" must be the last word in the load. These bits are decoded and used as clock and control signals within the DTI.

TABLE I

| Memory Address | Main Memory 310 Bits 11 10 9 8 7 6 5 4 3 2 1 | Memory Address Counter 314 Output | Clock | Clear | Sector Counters 342 (No. 1) | 352 (No. 2) |
|---|---|---|---|---|---|---|
| 0 | 00 $C_{(N-1)1}$ | 0 | | DTI | 3 | 1023 |
| 1 | 00 $C_{(N-1)2}$ | 1 | CTR NO. 1 | | 0 | 1020 |
| 2 | 00 $C_{(N-2)1}$ | 2 | PRSA | | 3 | 1023 |
| 3 | 00 $C_{(N-2)2}$ | 3 | CTR NO. 1 | | 0 | 1020 |
| . | . | . | . | | . | . |
| 2N−1 | 01 0 0 0 0 0 0 0 0 0 | 2N−1 | PRSA | | 3 | 1023 |
| 2N | 00 $C_{(0)1}$ | 2N | EOF | | 3 | 1023 |
| 2N+1 | 00 $C_{(0)2}$ | 2N+1 | CTR NO. 1 | | 0 | 1020 |
| 2N+2 | 00 $B_{(M-1)1}$ | 2N+2 | PRSA | | 3 | 1023 |
| 2N+3 | 00 $B_{(M-1)2}$ | 2N+3 | CTR NO. 1 | | 0 | 1020 |
| 2N+4 | 00 $B_{(M-2)1}$ | 2N+4 | PRSA | | 3 | 1023 |
| 2N+5 | 00 $B_{(M-2)2}$ | 2N+5 | CTR NO. 1 | | 0 | 1020 |
| . | . | . | . | | . | . |
| 2(N+M)−1 | 01 0 0 0 0 0 0 0 0 0 | 2(N+M)−1 | PRSA | | 3 | 1023 |
| 2(N+M) | 00 $B_{(0)1}$ | 2(N+M) | EOF | | 3 | 1023 |
| 2(N+M)+1 | 00 $B_{(0)2}$ | 2(N+M)+1 | CTR NO. 1 | | 0 | 1020 |
| 2(N+M)+2 | 10 0 0 0 0 0 0 0 0 0 | 2(N+M)+2 | PRSA | | 3 | 1023 |
| | | 0 | | EOB | 3 | 1023 |
| . | | | | | | |
| 1023 | | Unused Memory | | | | |

As also shown in FIG. 3, memory address counter 314, two sector counters 342 and 352, and the EOF-/EOB decode gates are required to control the clocking of coefficients. For each beam position, the DTI initially clears counter 314, thereby positioning $C_{(N-1)1}$ at the memory output because of the zero address. The counter 314 then counts sequentially, transferring new coefficients to the memory 310 output until cleared by a decoded EOB pulse, at which time a complete cycle has been traversed through the 2(N+M) stored coefficients. The MULT clock coupled to the pipeline register 318 actually transfers coefficients from the memory output to the MTI multiplier input and causes each coefficient to be used a number of times between counter 314 counts. Clock signals for counter 314 are generated with an "OR" combination of the decoded EOF signal, a PRSA clock, and sector counter 342 and 352 outputs. The PRSA timing signal is simply the PRST signal from the timing and control unit 160 with the first pulse blanked, whereas the sector counters 342 and 352 output pulses (defined as outputs 331 and 332, respectively) are generated each time the counters reach a zero count.

Sector counter 342, which is clocked by the MULT signal, counts the number of range bins in the first sector. When the last range bin in the sector has been processed, the counter will be at zero, thus resulting in decode circuit 344 providing an output pulse 331 that shifts a $C_{n2}$ coefficient to the memory output to replace a $C_{n1}$ coefficient. In a similar manner, sector counter 352 counts the total number of range bins in the first two sectors and changes $C_{n2}$ to $C_{n3}$ when its count reaches zero. Consequently, for this example, input register 340 must be loaded with range bin No. 3 and input register 350 with 1023 (the maximum possible count). This maximum value insures that the count for the second and last sector in the example never reaches zero. The master range bin counter (not shown) in the MTI will halt MULT pulses and counter 352 will only be at 19 at the end of the 1003 range bins. Although R=1000, the master range counter must be loaded with R+3 to insure that processing is completed for the remaining pipeline stages when MULT is halted. The complete sequence of counts are not listed in the sector counter columns of Table I. Only the counts at timing corresponding to memory address counter 314 output changes are given. When clocking is halted at the end of the PRI cycle, the first three range bins will have been processed with $C_{n1}$, the following 997 will have been processed with $C_{n2}$. The processor will remain in a dormant state until the next PRF pulse. The PRF reloads the sector counters with 3 and 1023, respectively, and generates a PRSA clock that transfers $C_{(n+1)1}$ to the memory output to replace $C_{n2}$. The only remaining type of clock signal is EOF, which occurs when bit 10 is "1". This bit is used to signal the MTI that the last coefficients in the filter, $C_{01}$ and $C_{02}$, is next transferred to the multiplier, and that an MTI residue is to be output to the VMU after these two coefficients are used for processing. The EOF clock is also used to transfer $C_{01}$ to the main memory 312 output because the normal clock, PRSA, was already used to transfer the EOF word out of memory. In addition, the two clear signals from counter 314 are DTI which clears the counter at the beginning of each cycle, and EOB which clears the counter after each cycle through the 2(N+M) coefficients.

A typical timing sequence for register control and memory read/write operations for integrator 600 begins with the $N^{th}$ PRI. VMU output data are transferred (INTG clock pulse, not shown) to the integrator input register where it is added with the previously stored residue forming a new integrator residue for a given range bin. Once addition is complete, data are stored into the temporary register in preparation for a memory write sequence. The memory write function is identical to the procedure described for the MTI. Data in the temporary register are written into memory, the address register is loaded with a new address, and the address counter is updated simultaneously. After completion of the write, new data are accessed from memory and the process reiterated for a new range bin.

As shown in FIG. 5, the integrator 600 outputs are clocked into the threshold detector 610 by the THRH clock input to register 614. Outputs (ALARM BITS) from the magnitude comparator 616 ("1" for a target and "0" for no target) are written into a memory cell corresponding to a particular range bin by the WRITE clock, gating AND gate 627 or 628. Then, the ADDRESS clock increments the memory address for storage of the next ALARM BIT. This cycle continues until R range bins have been processed.

The PDTU (FIG. 6) is a multimode interface circuit which provides a flexible means of transferring data in and out of the other signal processor circuits. Data transfer requirements between the signal processor and external hardware systems (radar, manual control, computer) are controlled by the PDTU for five operational modes: search, track, measurement, loading, and diagnostics. During local operations which may use the manual control console, the PDTU provides loading and diagnostic capabilities. During high speed operation exceeding the manual control capabilities the PDTU may be under computer control.

The manual control console contains control and pulse generation logic for data input control and lamp driver circuitry for data output control. This console interfaces with the PDTU 400 signal processing circuits to provide input signals controlling modes of operation. Similarly, under computer control, the computer communications circuit 180 functions as a universal data transceiver for coupling data to and from the computer and provides necessary timing and control signals to the DTU.

The input data transfer module 410 of data transfer unit 400 is shown in FIG. 7 and contains input data multiplexers 412, drivers 413, micro-word registers 414, 415 and 416, and word counters 417 and 418. The composite micro-word register accepts a single 32-bit data word from either the manual control console or computer communications module. Bits 0 through 11 of this word represent control signals which configure the transfer and control module for proper interface operation corresponding to the particular operating mode. The remaining bits in the micro-word are loaded into two digital down counters. During PSP loading, the input-output counter 417 specifies the total number of words to be transferred from the computer. Upon completion of the data transfer, corresponding to a zero word count, outputs from I/O counter 417 reset the PDTU and initialize logic to begin a new I/O sequence. For PDTU buffer transfer to the computer, the I/O counter 417 specifies the total number of words to transfer from buffer memory 1. During the search, track, and measurement modes of operation, it is necessary to delay PDTU buffer loading until a specified minimum range bin. The range delay counter 418 performs this function by disabling buffer operations until the minimum range bin, corresponding to a zero word count, has been reached.

Information required during operation in the search, track, or measurement modes is gated to the PDTU buffer memories by the output data multiplexer module 420. Two separate multiplexer circuits within module 420 are used to select specific data for loading into each of the output buffer memories.

The output data buffer module 430 stores the selected signal processor data into the two internal buffer memories, buffer memory 1 and buffer memory 2 (not shown). Two memory circuits are required because of the necessity of storing simultaneous data from separate signal sources. When the two buffers are loaded, a data ready command is sent to the data transfer timing and control module 440 alerting the control computer to access the stored information.

The data transfer timing and control module 440 performs all synchronization and control for PDTU 400. The module performs five separate logic functions. These functions consist of digital synchronization logic which synchronizes PDTU timing and controls data flow within the unit as required by the particular mode of operation. In addition, logic is included on the module to format and display the memory address during manual operations involving either one of the signal processor memories previously described.

Timing and control functions for the PDTU are formulated for two phases of operation: programmable signal processor loading and PDTU buffer memory operations. Timing involving the buffer memories is further subdivided into two categories involving loading and transferring of stored data to the control computer for each of the three radar operational modes: search, track, and measurement.

Loading of the PSP is initiated at the beginning of each DTI prior to the first pulse repetition interval. A data ready signal coming from the output data buffer module is set to a high state at the beginning of each dwell. This enables data to be loaded into the PSP from the computer communications module during each radar dwell.

Figure 13:
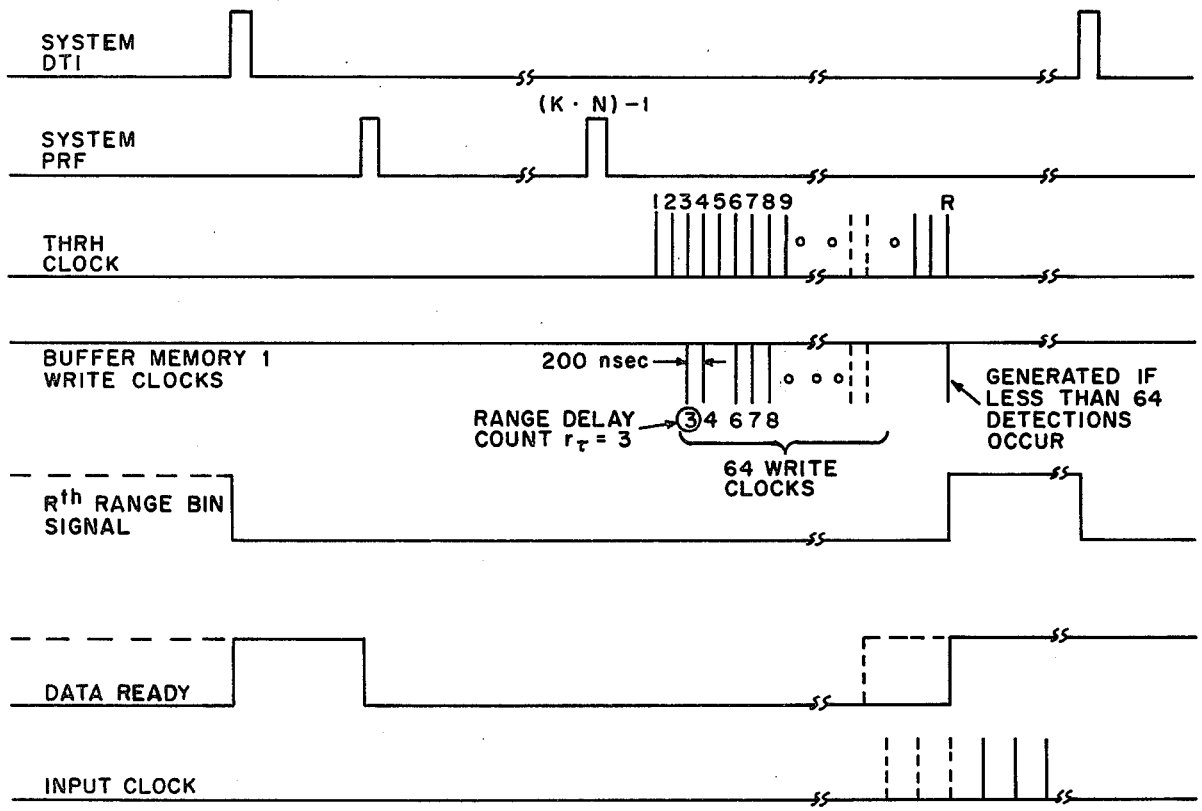
FIG. 13 is a typical timing sequence of the data transfer unit during radar search operations.

During the search, track, and measurement phases of operation, specific information beginning with a preselected minimum range bin $r_t$ must be loaded into the PDTU data buffers 1 and 2 and transferred to the computer to provide a sufficient data base for radar tracking algorithms and general analysis programs. For the search mode, integrator outputs and coinciding range bin numbers for the $(K \cdot N) - 1$ PRI are loaded into buffer memory 1 for each detection after the minimum range $r_t$ for up to 64 detections. Timing associated with this process is shown in FIG. 13. For the buffer memory 1 write clocks example, $r_t = 3$ and detections occur in range bins 3, 4, 6, 7, and 8. Thus, memory write clock pulses are generated beginning with range bin 3 for each bin in which detections occurred. If less than 64 detections occur when the $R^{th}$ range cell is reached, a final write clock pulse is generated to store a unique bit pattern in memory (all 0's) to signify the end of valid data. The data ready signal is also raised alerting the computer that buffer data are ready for access. However, if 64 detections occur before the $R^{th}$ range bin, buffer loading operations are halted and the data ready signal (dashed line) is raised. The computer input clocks can access data from the buffer for transfer to the computer, while the data ready signal is high.

Figure 14:
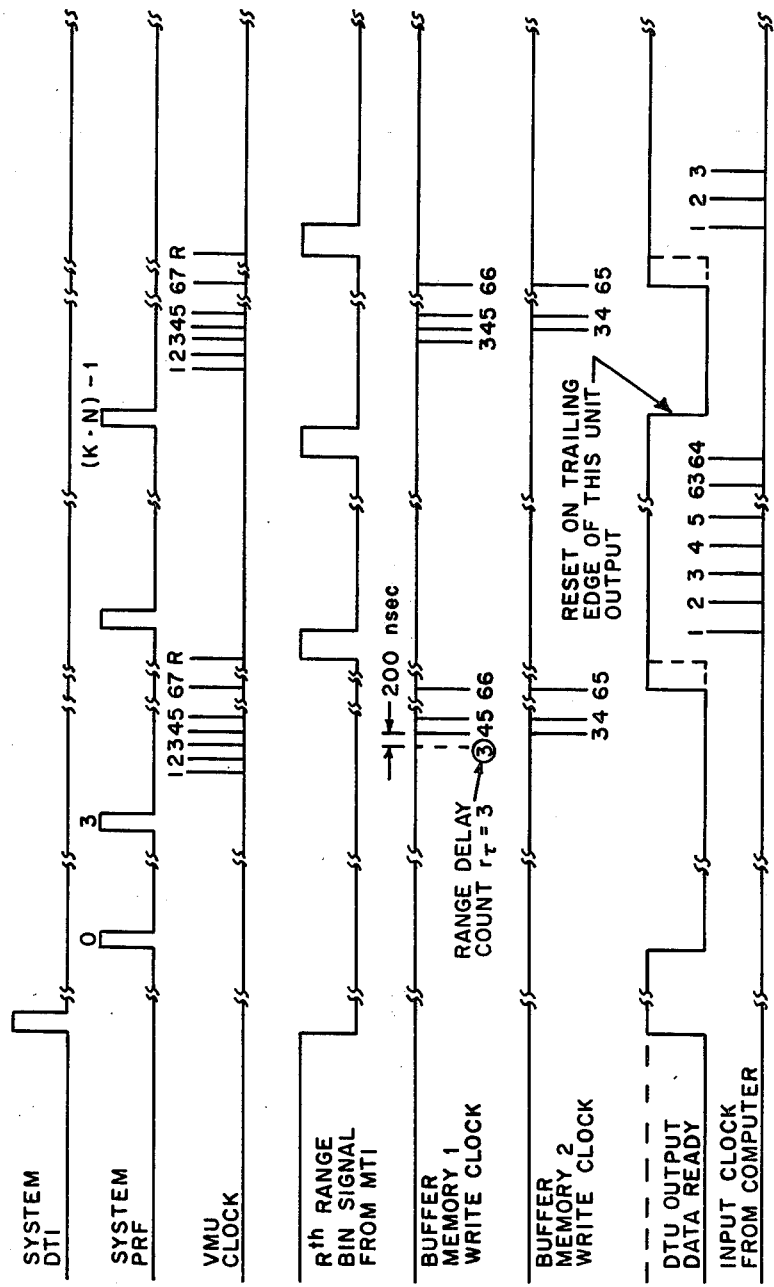
FIG. 14 is a typical timing sequence of the data transfer unit during track and measurement operations.

The typical timing sequence involving buffer operation during the track and measurement modes is shown in FIG. 14. In the measurement mode, digitized video outputs from A/D converters 12 and 14 and corresponding MTI residues for $r_t, r_{t+1}, \ldots, r_{t+64}$ are loaded into buffer memory 1 and buffer memory 2, respectively, for each PRI in a DTI. In the timing diagram, the VMU clock would be replaced by the MULT clock during measurement mode causing the buffer write sequence to occur every PRI. After completion of buffer storage or when the $R^{th}$ range bin is reached, the data ready signal is raised to allow data transfer to the computer and is reset by the computer interface. From this data spectral estimates of the environmental clutter can be obtained and consequently the signal processor coefficient memory 300 can be loaded from DTU 400 to suppress the clutter interference. For track operations, MTI outputs for $r_{t+1}, r_{t+2}, \ldots, r_{t+8}$ are stored in buffer memory 1, while integrator outputs for $r_t, r_{t+1}, r_{t+2}$ are stored in buffer memory 2 every $N^{th}$ PRI with data available for transfer to the computer each N-pulse group. Because the receiver video multiplexers are controlled by the PDTU during the track mode to provide sum and difference channel inputs to the processor, the MTI outputs can be used as inputs to angle-tracking algorithms.

The manual control console (not shown) is a combination of switches and lights which enables the operator to load and monitor data within the signal processor. The console is subdivided into four functional categories: control/data word, input/output operation, processor operation, and processor status. The control/data word consists of a 32-bit data field which enables the operator to monitor internal data or select a word which can be loaded into the PSP as data or a control word. The control/data section is under direct supervisory control by the I/O section. This portion of the control panel is split into two functions: (a) data input control and (b) data output control. The input control portion consists of four control switches and a display. Three of the switches operate in conjunction with the data switches and can either load PSP control words, data, or memory addresses. The fourth switch is a memory address autoincrement and, when activated, will updata the current memory address by one. The output control portion consists of four toggle switches and functions as control lines to the data output multiplexer offering 16 possible sources of data display.

The processor operation section provides system control for selection of either remote or local operation. In the remote mode, input and output control along with major system timing signals are provided by the PSTG and the control computer. During remote operation, all local control is inhibited, thus eliminating possible errors which could be induced through the manual control console. Other control functions are provided via the processor operation section for checkout and monitoring during local operation. These switches provide system reset, static data control, and DTI control for three different test signal sources or for normal inputs coming from the A/D converters.

The processor status section is an information display which indicates the operational status of the PSP. During normal operation, indicator lamps display the processor mode and also any overflow condition which might have occurred during the processing sequence.

The programmable signal processor can be operated with substantially all of the components coming from the Texas Instruments 7400 family of TTL (transistor transistor logic) integrated circuits. For example:

| | |
|---|---|
| input multiplexers | SN 74157 |
| multiplier and correction 116 | SN 74283 and SN 74284 |
| counter 342 | SN 74193 |
| Decode "0" 344 | SN 7402 |
| register 514 | SN 74194 |
| output data multiplexer module 420 | SN 74158 and SN 74150 |

-continued

| | |
|---|---|
| | (16 to 1 multiplexer) |
| Other components are: | |
| output data buffer module 430 | Signetics 82S09 (buffers 1 and 2) |
| control computer | Systems Engineering Laboratory Model 8600 |

While the invention has been described in connection with certain specific embodiments thereof, it will be understood that other modifications will suggest themselves to those skilled in the art and that it is intended to cover such modifications that fall within the scope of the claims appended hereto.

We claim:

1. A signal processor for providing high-order moving target indicator filtering at radar operating speeds comprising: first and second digital moving target indicator filters, each having first and second inputs and an output, the respective first inputs of said filters being adapted for receiving radar intelligence signals; a data transfer unit having a plurality of inputs and outputs, first and second of said inputs being adapted for coupling to respective outputs of said first and second indicator filters, first and second of said outputs being adapted for coupling to respective second inputs of said indicator filters, said inputs and outputs being adapted for coupling signals to and from said data transfer unit; and third and fourth inputs of said plural inputs being coupled in parallel respectively with said first inputs of said first and second moving target indicator filters, being adapted for receiving said radar intelligence signals; and the outputs of said moving target indicator filters being adapted to provide an output signal for load or display.

2. A signal processor as set forth in claim 1 and further comprising a vector magnitude unit having first and second inputs coupled to the respective outputs of said first and second indicator filters, a third input adapted to receive a third output of said data transfer unit plural outputs, and having an output; a threshold detector having a first input coupled to receive the output of said vector magnitude unit, a second input adapted to receive a fourth output of said data transfer unit outputs, and having first and second outputs, said first output of said threshold detector being adapted for coupling signals to said data transfer unit and said second output being adapted to provide an output display signal for coupling to indicating circuitry.

3. A signal processor as set forth in claim 2 and further comprising an integrator coupled between the output of said vector magnitude unit and said threshold detector input.

4. A signal processor as set forth in claim 3 wherein said moving target indicator filters each have respective third inputs, and further comprising a coefficient memory unit for providing moving target indicator filter coefficients which can be modified as a function of beam position and range allowing separate filter characteristics for range sectors and having first and second outputs coupled as inputs to the respective third inputs of said moving target indicator filters for combining with the first and second inputs of said filters, said coefficient memory unit having an input adapted to receive a fifth output of said outputs from said data transfer unit.

5. A signal processor as set forth in claim 4 wherein said moving target indicator filters each comprise a single multiplier having first, second, and third inputs and an output, an adder having first, second, and third inputs and an output, an adder having first, second, and third inputs and first and second outputs, and an accumulator having a first input coupled to receive the first output of said adder, an output coupled back as the second input of said adder, and a second input; the second output of said adder being coupled as the indicator output to said vector magnitude and said data transfer units, the first input of said adder being coupled to the output of said multiplier, said third and first multiplier inputs being adapted to receive said coefficient memory unit input and said input radar intelligence signals respectively, and said second multiplier input, said third adder input and said second accumulator input are adapted for receiving said data transfer unit output.

6. A signal processor as set forth in claim 5 wherein said coefficient memory unit comprises a main memory having first and second inputs and an output; an input register coupled between the first input of said main memory and the fifth or coefficient output of said data transfer unit; an address counter coupled between the second input of said main memory and said coefficient output of said data transfer unit; a pipeline register having an input coupled to the output of said main memory and an output coupled as said first and second coefficient memory unit outputs to said moving target indicator filters.

7. A signal processor as set forth in claim 6 wherein said coefficient memory unit further comprises a multiplexer coupled between said main memory output and said pipeline register input, said multiplexer further having an input coupled to said coefficient output of said data transfer unit for multiplexing input signals thereto prior to coupling signals to said pipeline register; and means for gating said address counter, said means for gating being coupled between said counter, said main memory and said coefficient output of said data transfer unit.

8. A signal processor as set forth in claim 7 wherein said vector magnitude unit comprises a comparator having first and second inputs coupled respectively as said vector magnitude inputs for receiving the outputs of said first and second indicator filters and having first and second outputs, and an adder having first and second inputs coupled to respective outputs of said comparator and an output coupled as said vector magnitude unit output to said integrator.

9. A signal processor as set forth in claim 8 wherein said data transfer unit comprises a data transfer module having an input and an output; a data multiplexer module having an input and an output; and a data buffer module having an input coupled to the output of said data multiplexer module and an output adapted for coupling output data signals to a load circuit; the input of said data transfer module being adapted for receiving input data signals for transferring data from said load to said signal processor, said data transfer module output being coupled as said data transfer unit outputs; and the input of said data multiplexer module being adapted to receive input data signals from said signal processor for coupling to said data buffer.

10. A signal processor as set forth in claim 1 wherein said moving target indicator filters each have a third input; and further comprising a coefficient memory unit having first and second outputs coupled to respective third inputs of said first and second moving target indicator filters, and said coefficient memory unit having an input adapted to receive selectable or predetermined signals for changing the coefficient memory unit output signals.

11. A signal processor as set forth in claim 10 wherein said coefficient memory unit comprises a main memory having first and second inputs and an output; an input register having an input and an output, said output being coupled to the first input of said main memory; an address counter having an input and an output, said output being coupled to the second input of said main memory; said inputs of said input register and said address counter being adapted to receive input signals for coupling to said main memory; and a pipeline register having an input coupled to the output of said main memory and an output coupled as said first and second coefficient memory unit outputs to said moving target indicator filters.

12. A signal processor as set forth in claim 11 wherein said coefficient memory unit further comprises means for gating said address counter, said means for gating including first and second OR gates, first and second AND gates and first and second parallel, signal processing channels; the outputs of said OR gates being coupled as gating inputs of said address counter; the respective outputs of said first and second AND gates being coupled as respective first inputs of said first and second OR gates; at least one input of each of said gates being adapted to receive a periodic timing signal; a second input of each of said AND gates being adapted to receive an output signal from said main memory; and each of said parallel signal processing channels including, coupled in series, a register, a sector counter unit and a decoder; the input of each of said registers being adapted to receive input signals for activating said second OR gate; and the output of each of said decoders being coupled as an input to said second OR gate.

13. A signal processor as set forth in claim 10 wherein said data transfer unit comprises a data transfer module having an input and an output; a data multiplexer module having an input and an output; and a data buffer module having an input coupled to the output of said data multiplexer module and an output adapted for coupling output data signals to a load circuit; the input of said data transfer module being adapted for receiving input data for transferring data from said load to said signal processor, said data transfer module output being coupled as data transfer unit outputs to said coefficient memory unit input for providing inputs to said address counter and registers; and the input of said data multiplexer module being adapted to receive input data signals from said signal processor for coupling to said data buffer.

14. A signal processor as set forth in claim 13 wherein said data transfer module of said data transfer unit comprises a data driver circuit having an input adapted to receive input signals from said load, and outputs responsive to said input signals to provide said data transfer unit outputs; and further comprising first, second and third registers responsive to said data driver circuit output to provide control output signals for said data transfer unit.

15. A signal processor as set forth in claim 4 wherein said vector magnitude unit comprises a comparator means and an adder means; said comparator means having first, second, and third inputs coupled as respective of said vector magnitude unit first, second, and third inputs for multiplexing and comparing signals coupled thereto, and having first and second outputs; and said adder means having first and second inputs coupled to respective first and second outputs of said comparator and an output coupled as said vector magnitude unit output to said integrator, said adder means comprising first, second, third, fourth, and fifth adder circuits and an output multiplexer; said multiplexer having an output coupled as said integrator output and having first, second, and third inputs; said first adder having a first input coupled to said first comparator means output, a second input, and an output coupled to said multiplexer first input; said second adder having a first output coupled to the second input of said first adder, an input coupled to the second output of said comparator means, and a second output; said third adder having first and second inputs coupled respectively to said second output of said comparator means and said second output of said second adder, and an output; said fourth adder having a first input coupled to the output of said third adder, a second input, and an output coupled to the second input of said multiplexer; said fifth adder having an input coupled to said first output of said comparator means and an output coupled to the second input of said fourth adder; and said third multiplexer input being adapted to receive a gating signal for selecting which one of said first and second multiplexer inputs will be output.

16. A signal processor as set forth in claim 15 wherein said comparator means of said vector magnitude unit comprises: first and second input multiplexing means, each having first and second inputs and an output, the first input of said first input multiplexing means being coupled as said vector magnitude unit first input, the first input of said second multiplexing means being coupled as said vector magnitude unit second input, and the respective second inputs of said first and second input multiplexing means being said third vector magnitude unit input adapted to receive said fifth output of said data transfer unit plural outputs; first and second input registers each having an input and an output and adapted to receive as said inputs the respective outputs of said first and second input multiplexing means; first and second multiplexers each having respective first, second, and third inputs, said first inputs of said first and second multiplexers being coupled respectively to said outputs of said first and second input registers, said second inputs of said first and second multiplexers being coupled respectively to said outputs of said second and first input registers, and having respective outputs coupled as said first and second comparator means outputs; and first and second comparators each having first and second inputs and an output; the inputs of said first comparator being coupled to receive respective outputs of said first and second registers, and the output being adapted to provide an input to each of said multiplexer third inputs for controlling which of the first or second inputs to said multiplexers is coupled as said comparator multiplexer outputs; said second comparator inputs being coupled to respective outputs of said first and second multiplexers for comparing one-half of the output signal magnitude of the first multiplexer output to the full signal magnitude output of the second multiplexer; and said output of said second comparator being coupled as the third input to said adder means output multiplexer.

17. A signal processor as set forth in claim 16 wherein said first and second inputs to said adder means is respective larger and smaller input signals, said second adder receiving said second or smaller input signal for providing the function of adding one-sixteenth the smaller signal and one-eighth the smaller signal from the input signal, said third adder providing the function of adding three-sixteenths the smaller signal and one-half the smaller signal input signals, said fifth adder receiving said larger input signal for providing the function of adding one-half the larger signal and one-fourth the larger signal, said fourth adder, providing the function of adding said outputs of said third and fifth adder, and said first adder providing the function of adding the large signal input to the first output of said second adder, said first output being three-sixteenths of the smaller signal.

18. A signal processor as set forth in claim 17 wherein said third and fourth inputs of said plural inputs of the data transfer unit being adapted for receiving radar intelligence signals for providing interference components of unprocessed data directly to the data transfer unit so that appropriate coefficients of the moving target indicators can be established or modified for suppressing such interference.

* * * * *